(12) United States Patent
Driscoll et al.

(10) Patent No.: US 6,442,370 B1
(45) Date of Patent: *Aug. 27, 2002

(54) SYSTEM AND METHOD FOR COMPUTER BASED TEST CREATION

(75) Inventors: Gary Driscoll, Pennington, NJ (US); Richard Burns, Yardley; Barbara Keener, Buckingham, both of PA (US); Teresa Sanchez-Lazer, Hopewell, NJ (US); Alison Snieckus, Plainsboro, NJ (US); Paul SooHoo, Trenton, NJ (US); Linda Tyler, Ringoes, NJ (US); Kenneth Willian, Princeton, NJ (US); Victor Wichert, Hopewell, NJ (US)

(73) Assignee: Educational Testing Service, Princeton, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 09/777,836

(22) Filed: Feb. 5, 2001

Related U.S. Application Data

(63) Continuation of application No. 08/826,417, filed on Mar. 27, 1997.

(51) Int. Cl.$^7$ .................................................. G09B 3/00
(52) U.S. Cl. ....................... 434/350; 434/353; 434/118; 434/322; 434/323; 434/362
(58) Field of Search .................................. 434/350, 363, 434/118, 322, 323, 362

(56) References Cited

U.S. PATENT DOCUMENTS

| | | | | |
|---|---|---|---|---|
| 5,059,127 A | * | 10/1991 | Lewis et al. | 434/353 X |
| 5,433,615 A | * | 7/1995 | Clark | 434/322 X |
| 5,565,316 A | | 10/1996 | Kershaw et al. | |
| 5,657,256 A | * | 8/1997 | Swanson et al. | 702/119 |
| 5,827,070 A | * | 10/1998 | Kershaw et al. | 434/322 X |
| 5,954,516 A | * | 9/1999 | Heinberg | 434/322 X |
| 6,259,890 B1 | * | 7/2001 | Driscoll et al. | 434/350 X |

OTHER PUBLICATIONS

Willis, W., "New Assessment Tools Provide a Closer Look at Students' Mastery", *Technol. Horizons in Education,* 1996, 24(4), 8 Pages.

* cited by examiner

*Primary Examiner*—Joe H. Cheng
*Assistant Examiner*—Chanda Harris
(74) *Attorney, Agent, or Firm*—Woodcock Washburn LLP

(57) ABSTRACT

A computer-based test creation system and method for generating test items. The test creation process includes creating items in electronic form and allowing access by a plurality of reviewers via a network. The reviewers may review the item for content, fairness and format, and collaborate with each other before indicating that the item is acceptable for inclusion in a test. After the administration of the items to test takers, item performance may be evaluated on-line by reviewing electronic feedback from the administrations and creating electronic evaluation reports. Since the items are created in an electronic form, the items may further include new forms of stimuli such as graphics and multimedia.

16 Claims, 53 Drawing Sheets

FIG. 1 *(PRIOR ART)*

Questions 8-27 each consist of two quantities, one in Column A and one in Column B. You are to compare the two quantities and on the answer sheet fill in oval A if the quantity in Column A is greater;
B if the quantity in Column B is greater;
C if the two quantities are equal;
D if the relationship cannot be determined from the information given.

AN E RESPONSE WILL NOT BE SCORED

Notes:
1. In certain questions, information concerning one or both of the quantities to be compared is centered above the two columns.
2. In a given question, a symbol that appears in both columns represents the same thing in Column A as it does in Column B.
3. Letters such as x, n, and k stand for real numbers.

| EXAMPLES | | |
|---|---|---|
| Column A | Column B | Answers |
| E1. 2×6 | 2+6 | ●○○○○ A B C D E |
| E2. 180-x | y | ○○●○○ A B C D E |
| E3. p-q | q-p | ○○○●○ A B C D E |

(E2 includes a figure showing two adjacent angles $x°$ and $y°$ on a line)

| Column A | Column B |
|---|---|
| 8. $\frac{1}{2} \cdot \frac{2}{5}$ | $\frac{1}{2} \cdot \frac{2}{3}$ | r, s, and t are the degree measures of the three angles of a triangle

| | |
|---|---|
| 9. r + s | t | n > 0

| | |
|---|---|
| 10. 0.42 × n | 0.042 × 10n |

$\frac{3}{a} \cdot \frac{b}{4}$

| | |
|---|---|
| 11. ab | 12 |

Figure A

Figure B

In Figures A and B, pairs of line segments that meet at a point are perpendicular.

| | |
|---|---|
| 12. The perimeter of Figure A | The perimeter of Figure B |

| Column A | Column B |
|---|---|

Questions 13-14 refer to the following graph.

YIELD OF CROP P AT VARYING TEMPERATURES AND LIGHT INTENSITIES

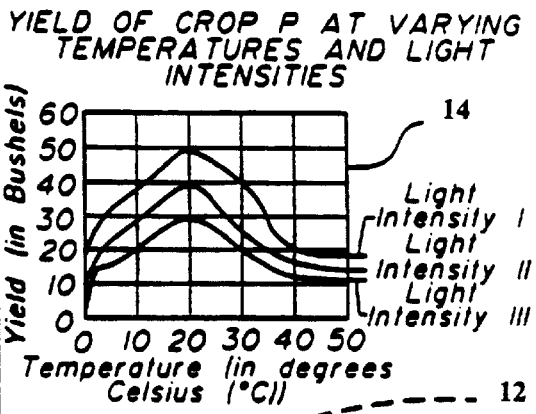

13. For the temperature range shown, the highest yield, in bushels, of crop P at light intensity II — 45

At light intensity III, for the temperature range shown, the highest yield, in bushels, of crop P is H and the lowest is L.

| | |
|---|---|
| 14. H - L | 30 |

Object Record

Object Information

Object ID:
Object Type:          circle
Tool Used:

Object Contains Color:   No

Subject Information

General Subject Class:   CBT
Category:
Keywords:
Text Description:        Training Example 1

Object

Object Database

| | Tool Used | Color | General Class | Description |
|---|---|---|---|---|
| ▼ 60 degree triangle | | | | |
| | FreeHand 4.0 (Windows) | No | PPT | No description |
| | PC PaintBrush 3.1 (Windc | No | CBT | No description |
| ▼ angles & arrowheads | | | | |
| | PC PaintBrush 3.1 (Windc | Yes | CBT | No description |
| ▼ circle | | | | |
| | PC PaintBrush 3.1 (Windc | No | CBT | Training Example 1 |
| ▼ common fractions | | | | |
| | PC PaintBrush 3.1 (Windc | Yes | CBT | No description |
| | FreeHand 4.0 (Windows) | No | PPT | No description |
| ▼ compound fraction | | | | |
| | PC PaintBrush 3.1 (Windc | No | CBT | No description |
| ▼ cube | | | | |
| | PC PaintBrush 3.1 (Windc | No | CBT | No description |
| | FreeHand 4.0 (Windows) | No | PPT | No description |

Test Creation Objects
View By:
- Object Type
- Subject
- Tool Used
- Keyword
- Object ID
- Deleted

FIG. 4A

Copyright Database

| | Copyright Owner | ID | Copyright Data | Party Granting Permission |
|---|---|---|---|---|
| ▼ basket | | | | |
| | | ZZ517003A | 01/02/96 | |
| ▼ bill gates | | | | |
| | | ZZ523027A | 01/01/96 | |
| ▼ C | | | | |
| | | | 06/07/12 | |
| ▼ Copyright Owner | | | | |
| | | | 01/01/11 | |
| ▼ ETS | | | | |
| | | ZZ529034A | 01/01/55 | |
| | | ZZ567001A | 10/10/96 | |
| | | | 08/08/96 | |
| | | | 03/03/33 | |

Copyright Information
View By:
- Copyright Information

Main Menu:
- Material Sources
- Copyright Information
- Accession Number

FIG. 5A

Copyright Information

Information

| | | | |
|---|---|---|---|
| Item Accession #: | ZZ834094 | Test Program: | GRE |
| Copyright ID #: | ZZ834094A | Correspondence #: | 00834094 |

Attached Documentation or Image:

Comments

Source Information

| | |
|---|---|
| Title: | Gone With The Rain |
| Author/Artist: | Margaret Mitchell |
| Source: | Gone With The Rain |
| Publisher: | Harcourt Brace |
| Type of Source: | Passage |
| Copyright date: | 12/31/96 |
| # of Pages in Original: | 535 |
| # of Words Used: | |

Copyright owner: Harcourt Brace
# of Lines in Original (for poetry):
# of Lines Used (for poetry):

Format for intended use of visual material:
May material be scanned for non-transient storage?

Copyright Information

Permission required to use material?
Reason if permission is not required:

Copyright Request

Date of request to copyright holder:
Request fulfilled?    No              Date fulfilled:
Authorized by:
Conditions/Constraints:    None
Credit line required?
Credit line must appear exactly as follows and may not be changed to conform to ETS style:

Payment

Amount paid:
Withhold payment until production?

Audit Trail

| | | | |
|---|---|---|---|
| Created by: | Peggy Redman | Date Created: | 12/31/96 10:26:37 AM |
| Last Modified by: | Barbara Keener | Date Last Modified: | 12/31/96 10:26:15 AM |
| Target Lock Date: | | | |
| Date of Internal Copyright Request: | 12/31/96 | | |
| Date Copyright Request Fulfilled: | | | |
| Copyright Reviewer: | | Copyright Signoff: | |

Version: 2.0

FIG. 5

Test Form -- Main

Test Information

| | | | |
|---|---|---|---|
| Test ID: | KH328843 | Base Form/Pool ID: | |
| Complete Form Code: | 3SQ8/7 S100 | Timed Test? | Yes |
| 46a — Test Program: | GRE | Test Name: | Graduate Record Examination |
| 46b — Delivery Mode: | Paper Linear | Test Medium: | PPT |
| 46c — Test Edition: | Normal | Test Owner: | ETS |
| 46d — Number of Sections: | 7 | | |
|     Operational: | 6 | | |
|     Pretest: | 3 | | |
| Total # of Items in Test: | | | |

Test Assembly

Latest Status:

| Status | | Users | Dates |
|---|---|---|---|
| ● Open ○ Done | Test book covers complete | — | — |
| ● Open ○ Done | Test directions, timing, and other pertinent info complete | — | — |

Workflow Log

| | | | |
|---|---|---|---|
| Created by: | Stephen Chen | Date Created: | 12/19/98 |
| Modified by: | 12/19/98 12:35:43 PM | Date Modified: | 12/19/98 |

Version: 2.0 Demo

FIG. 6

*Test Form Database:*

| | | Test ID | Section ID | Name | Type | # Sections | Sequence | Form Type |
|---|---|---|---|---|---|---|---|---|
| Test Form Code | ▼3SGR7 S100 | | | | | | | |
| | | ▼KH328843 | | Main | GRE | Normal | 7 | | Real |
| | | | KH328844 | GRE Verbal Skills | Pretest | | 1 | |
| | ▼3SGR7 S122 | | | | | | | |
| | | ▼KH328808 | | Main | GRE | Normal | 7 | | Real |
| | | | KH328809 | GRE Quantitative Skills | Pretest | | 1 | |
| | ▼3SGR7 S123 | | | | | | | |
| | | ▼KH328813 | | Main | GRE | Normal | 7 | | Real |
| | | | KH328814 | GRE Quantitative Skills | Pretest | | 1 | |
| Main Menu: | ▼3SGR7 S124 | | | | | | | |
| Test Form Code | | ▼KH328815 | | Main | GRE | Normal | 7 | | Real |
| Package Code | | | KH328816 | GRE Quantitative Skills | Pretest | | 1 | |
| Metrics:Cycle Image | ▼3SGR7 S125 | | | | | | | |
| Metrics:Counts | | ▼KH328817 | | Main | GRE | Normal | 7 | | Real |
| | | | KH328818 | GRE Quantitative Skills | Pretest | | 1 | |

FIG. 6A

*Test Type Database:*

| | Test Type | Medium | Type | Name | # of Constituents | Section Type |
|---|---|---|---|---|---|---|
| Test Creation Test Type | ▼ACME TESTS OF SUBJECT KNOWLEDGE | | | | | |
| General Views: | ▼ACME TEST | PPT | Main | | 4 Sections | |
| Test Program | | | Section | Comparative Go | Min: 30 - Max: 30 | Operational |
| Profile | | | Section | Music Test | Min: 30 - Max: 30 | Operational |
| Test Type | ▼Graduate Record Examination | | | | | |
| Role Conflicts | ▼GRE | CBT | Main | | 7 Sections | |
| | | | Section | GRE Quantitativ | Min: 28 - Max: 28 | Operational |
| | | | Section | GRE Quantitativ | Min: 28 - Max: 28 | Operational |
| | | | Section | GRE Quantitativ | Min: 28 - Max: 28 | Pretest |
| | | | Section | GRE Verbal Ski | Min: 28 - Max: 28 | Operational |
| | | | Section | GRE Verbal Ski | Min: 28 - Max: 28 | Operational |
| | | | Section | GRE Verbal Ski | Min: 28 - Max: 28 | Pretest |

FIG. 8A

Test Form -- Section

Test Information

| | | | |
|---|---|---|---|
| Test ID: | KH328843 | Base Form/Pool ID: | |
| Complete Form Code: | 3SGR7 S100 | Timed? | Yes |
| Test Program: | GRE | Test Program Name: | Graduate Record Examination |

Section Information

| | | | |
|---|---|---|---|
| Section ID: | KH328844 | Sequence #: | 1 |
| Section Name: | GRE Verbal Skills | Section Type: | Pretest |
| Minimum # of Items: | 30 | Maximum # of Items: | 30 |
| Actual # of Items: | 30 | Section Usage: | Pretest |
| Actual # of Operational Items: | | Subject: | GRE Verbal Skills |
| Worksheet Name: | | Project Code (PJ): | |
| Worksheet Comments: | | Test Form ID: | |
| Request #: | | Request Date: | |
| Due for Packaging: | 04/01/97 | Admin Date: | 12/14/96 |

Item Information

Item Accession #s:
File Attachments:

Paper Linear:

| | |
|---|---|
| File with Formatted Test: | |
| Special Scoring Report: | |
| Changed Items Report: | |
| Comparison to Specification Report: | |
| Miscellaneous files: | Note: This section was built in version 1 and administered in December 1996. The items in this pretest section are due to be placed into the CBT operational pool in April 1997 package. |
| SKM file: | |
| TAS Item List | |
| PPT Linear Comments: | |

CAT:

| | |
|---|---|
| Changed Items Report: | |
| Special Scoring Information Report: | |
| TAS Item List | |
| TSP: | |
| .IRT: | |
| .TTM: | |
| .SMM: | |
| .OVL: | |
| .BLK: | |
| .SC: | |
| .EXP: | |
| .CAT: | |
| .SKM: | |
| Scoring Table: | |
| Miscellaneous: | |
| CAT Comments: | |

FIG. 7

Test Type

| | |
|---|---|
| Test Type Name: | GRE |
| Test Edition: | PPT |
| Test Owner: | ETS |
| # Possible Presets: | 3 |
| # Possible Equatings: | 1 |
| Number of Sections: | 7 |

File Attachments:

| | |
|---|---|
| Test Type Long Name: | Graduate Record Examination |
| Test Edition: | Normal |
| # Operational Sections: | 6 |
| # Pretest Sections: | 1 |
| # Equating Sections: | 0 |

FIG. 8

Test Section

Test Information
- Test Type Name: GRE
- Test Medium: PPT
- Test Owner: ETS
- Test Type Long Name: Graduate Record Examination
- Test Edition: Normal

Section Information
- Section Name: GRE Quantitative Skills
- Subject: GRE Quantitative Skills
- Number of Occurrences: 2
- Minimum # of Items: 30
- Allowable Response Types: Quantitative Comparison, Problem Solving, Data Interpretation
- Section Long Name: GRE Quantitative
- Timed: Yes
- Type of Section: Operational
- Maximum # of Items: 30

File Attachments
- File Attachments:

FIG. 9

History

IDENTIFICATION

| | |
|---|---|
| Accession Number: | V8108039 |
| Test Name: | GRE Verbal Skills |
| Test Form: | 3SGR7 S100 |
| Section #: | |
| Item #: | 1 |
| Usage in Form: | Pretest, non-equator |
| Redline Flag: | No Revision |
| Delivery Mode: | PPT |

Overall Status and Summary

| | |
|---|---|
| Stats Required: | IA, IRT |
| IA Status: | Not Examined |
| IRT Status: | Not Examined |
| DIF Status: | Not Examined |

History Historical

| | |
|---|---|
| Key ID: | 8 |
| HIST Sequence #: | |
| Secure Test Usage: | |

Version: Training 2.0

FIG. 10B

History:

| | Test Name | Section | Item # | Red Line | Status |
|---|---|---|---|---|---|
| Pre-Test Items History | ▼3SGR7 S100 | | | | |
| | ▼VB107057 | | | | |
| View By: | GRE Verbal Skills | | 9 | No Revision | PreTest non-equator |
| Accession No | ▼VB107061 | | | | |
| Test Name | GRE Verbal Skills | | 10 | No Revision | PreTest non-equator |
| Test Form | ▼VB107069 | | | | |
| | GRE Verbal Skills | | | No Revision | PreTest non-equator |
| | ▼VB107079 | | | | |
| | GRE Verbal Skills | | 17 | No Revision | PreTest non-equator |
| | ▼VB107080 | | | | |
| | GRE Verbal Skills | | 18 | No Revision | PreTest non-equator |
| Main Menu: | ▼VB107081 | | | | |
| Operational Items | GRE Verbal Skills | | 19 | No Revision | PreTest non-equator |
| Pre-Test Items | ▼VB107082 | | | | |
| Try-Out Items | GRE Verbal Skills | | 20 | No Revision | PreTest non-equator |
| Combined Stats | ▼VB107083 | | | | |
| | GRE Verbal Skills | | 21 | No Revision | PreTest non-equator |

Item Analysis:

☑ Batch Approval   ◀ Back to Previous Menu   ◀ Back to Main Menu

| | Test Name | Section # | Item # | Base N | Omit | Mean | R | Mean | 3 | |
|---|---|---|---|---|---|---|---|---|---|---|
| Pretest Items Awaiting Review IA | ▼3SGR7 S100 | | | | | | | | | |
| | ▼VB108039 | | | | | | | | | |
| View By: | VERBL 3 | 3 | 1 | 1120 | 0 | 0 | 39 | 11.4 | 1005 | 13. |
| Accession No | ▼VB108040 | | | | | | | | | |
| Test Name | VERBL 3 | 3 | 2 | 1120 | 1 | 11 | 21 | 8.5 | 997 | 13. |
| Test Form | ▼VB108041 | | | | | | | | | |
| Pre-Test Items: | VERBL 3 | 3 | 3 | 1120 | 1 | 9 | 66 | 12 | 12 | 10 |
| Awaiting Review | ▼VB108042 | | | | | | | | | |
| Review | VERBL 3 | 3 | 4 | 1120 | 0 | 0 | 57 | 9.7 | 969 | 13. |
| IRT | ▼VB108043 | | | | | | | | | |
| DIF | VERBL 3 | 3 | 5 | 1120 | 3 | 9.3 | 762 | 14.3 | 47 | 9.5 |
| Main Menu: | ▼VB108044 | | | | | | | | | |
| Operational Items | VERBL 3 | 3 | 6 | 1120 | 0 | 0 | 8 | 7.4 | 8 | 7.8 |
| Pre-Test Items | ▼VB108045 | | | | | | | | | |
| Try-Out Items | VERBL 3 | 3 | 7 | 1120 | 2 | 8.5 | 20 | 9 | 99 | 11. |
| Combined Stats | ▼VB136006 | | | | | | | | | |
| | VERBL 3 | 3 | 8 | 1120 | 16 | 12.1 | 175 | 11.2 | 68 | 10. |

IDENTIFICATION

| | |
|---|---|
| Accession Number: | V8108039 |
| Test Name: | VERBL 3 |
| Test Form: | 3SGR7 S100 |
| Section #: | 3 |
| Item #: | 1 |
| IA Status: | Not Examined |
| Usage in Form: | PreTest, non-equator |
| Number of Examinees: | 1120 |

IA Critical

| Omit | A | B | C | D | E | Mtst | Reg Scale | Delta E | Crit |
|---|---|---|---|---|---|---|---|---|---|
| 0 | 39 | 1006 | 33 | 17 | 26 | 13 | 3DGR | 8.6 | XS 76 |
| Mean | Mean | Mean | Mean | Mean | Mean | Ptst | Avg IS | Delta O | CorrCrit |
| 0.0 | 11.4 | 13.4 | 10.0 | 9.1 | 8.1 | 1.0 | 0.9 | 7.9 | 0.45 |

IA Historical

| | |
|---|---|
| Item Key: | B |
| Run Date: | 12/31/96 |
| Statistics Source: | |
| Mean Score NR: | |
| N For Response NR: | |
| Parameter BPh: | 0.0 |
| IA Sequence #: | |

Version: Training 2.0

FIG. 11

DIF

IDENTIFICATION

| | |
|---|---|
| Accession Number: | VB106039 |
| Test Name: | GRE PRET |
| Test Form: | 3SGR7 S100 |
| Section #: | 3 |
| Item #: | 1 |
| DIF Status: | Not Examined |
| Usage in Form: | PreTest, non-equator |

DIF Critical

| Worst DIF | Male/ Female | White/ Black | White/ Hispanic | White/ Asian American | White/ American Indian |
|---|---|---|---|---|---|
| A 1.42 | A -0.38 | A 1.42 | | | |

DIF Historical

| | |
|---|---|
| Run Date: | 12/31/96 |

Version: Training 2.0

FIG. 12

DIF:

| | Test Name | Section # | Item # | Worst DIF | M/b | W/B | W/Hsp | W/AsAb |
|---|---|---|---|---|---|---|---|---|
| ▼3SGR7 S100 | | | | | | | | |
| ▼VB108039 | GRE PRET | 3 | 1 | A 1.42 | A -0.38 | A 1.42 | | |
| ▼VB108040 | GRE PRET | 3 | 2 | A -1.32 | A 0.25 | A -1.32 | | |
| ▼VB108041 | GRE PRET | 3 | 3 | B 1.44 | B 1.44 | A -0.33 | | |
| ▼VB108042 | GRE PRET | 3 | 4 | A 0.42 | A 0.42 | A -0.34 | | |
| ▼VB108043 | GRE PRET | 3 | 5 | A -0.87 | A -0.87 | A 0.41 | | |
| ▼VB108044 | GRE PRET | 3 | 6 | A 0.35 | A 0.28 | A 0.35 | | |
| ▼VB108045 | GRE PRET | 3 | 7 | A 0.25 | A 0.20 | A 0.25 | | |
| ▼VB136006 | GRE PRET | 3 | 8 | A -0.27 | A -0.19 | A -0.27 | | |

Pretest Items Awaiting Review DIF

View By:
- Accession No
- Test Name
- Test Form

Pre-Test Items:
- Awaiting Review
- Item Analysis
- IRT

Main Menu:
- Operational Items
- Pre-Test Items
- Try-Out Items
- Combined Stats

FIG. 12A

IRT:

| | Test Name | Section # | Item # | Scaled Date | Ref Label | a | b | c | INFMAX |
|---|---|---|---|---|---|---|---|---|---|
| ▼3SGR7 S100 | | | | | | | | | |
| ▼VB108039 | V-PT | 3 | 1 | 01/14/97 | 3JGR3 | 0.69409 | -2.341395 | 0.123628 | 0.27 |
| ▼VB108040 | V-PT | 3 | 2 | 01/14/97 | 3JGR3 | 0.49694 | -2.817488 | 0.123628 | 0.14 |
| ▼VB108041 | V-PT | 3 | 3 | 01/14/97 | 3JGR3 | 0.70818 | -1.906912 | 0.123628 | 0.29 |
| ▼VB108042 | V-PT | 3 | 4 | 01/14/97 | 3JGR3 | 1.002475 | -1.396652 | 0.374594 | 0.35 |
| ▼VB108043 | V-PT | 3 | 5 | 01/14/97 | 3JGR3 | 1.176745 | -0.737503 | 0.161427 | 0.74 |
| ▼VB108044 | V-PT | 3 | 6 | 01/14/97 | 3JGR3 | 0.619435 | -2.887175 | 0.123628 | 0.22 |
| ▼VB108045 | V-PT | 3 | 7 | 01/14/97 | 3JGR3 | 0.614297 | -2.080952 | 0.123628 | 0.22 |
| ▼VB136006 | V-PT | 3 | 8 | 01/14/97 | 3JGR3 | 0.951117 | 0.023219 | 0.185347 | 0.46 |

Pretest Items Awaiting Review IRT

View By:
- Accession No
- Test Name
- Test Form

Pre-Test Items:
- Item Analysis
- DIF

Main Menu:
- Operational Items
- Pre-Test Items
- Try-Out Items
- Combined Stats

FIG. 13A

IRT

IDENTIFICATION

| | |
|---|---|
| Accession Number: | V8108039 |
| Test Form Designator: | 3SGR7 S100 |
| Test Name: | V - PT |
| Section Number: | 3 |
| Item Number: | 1 |
| IRT Review Status: | Not Examined |
| Usage in Form: | PreTest, non-equator $_8$ |

IRT Critical

| Scaled Date | THMAX | a | b | c |
|---|---|---|---|---|
| 01/14/97 | 8.2 | 0.69409 | -2.34139$ | 0.123628 |

| Ref Label | INFMAX | INFSSMAX | SSMAX | # Examinees |
|---|---|---|---|---|
| 3JGR3 | 0.27 | 0 | 319 | 25284 |

IRT Historical

FIG. 13

*Parameters Database*

FIG. 14

*Accnums*

FIG. 15

*TCS Help*

FIG. 16

Abstract
- Stem
  - newstemstemstemstem
- Response
  - A. response
  - B. response
  - C. response
  - D. response
  - E. response

Panes
Keys

> Keys. Use the Keys tool to set and review the item's keys.

Control
ScratchPad

FIG. 17

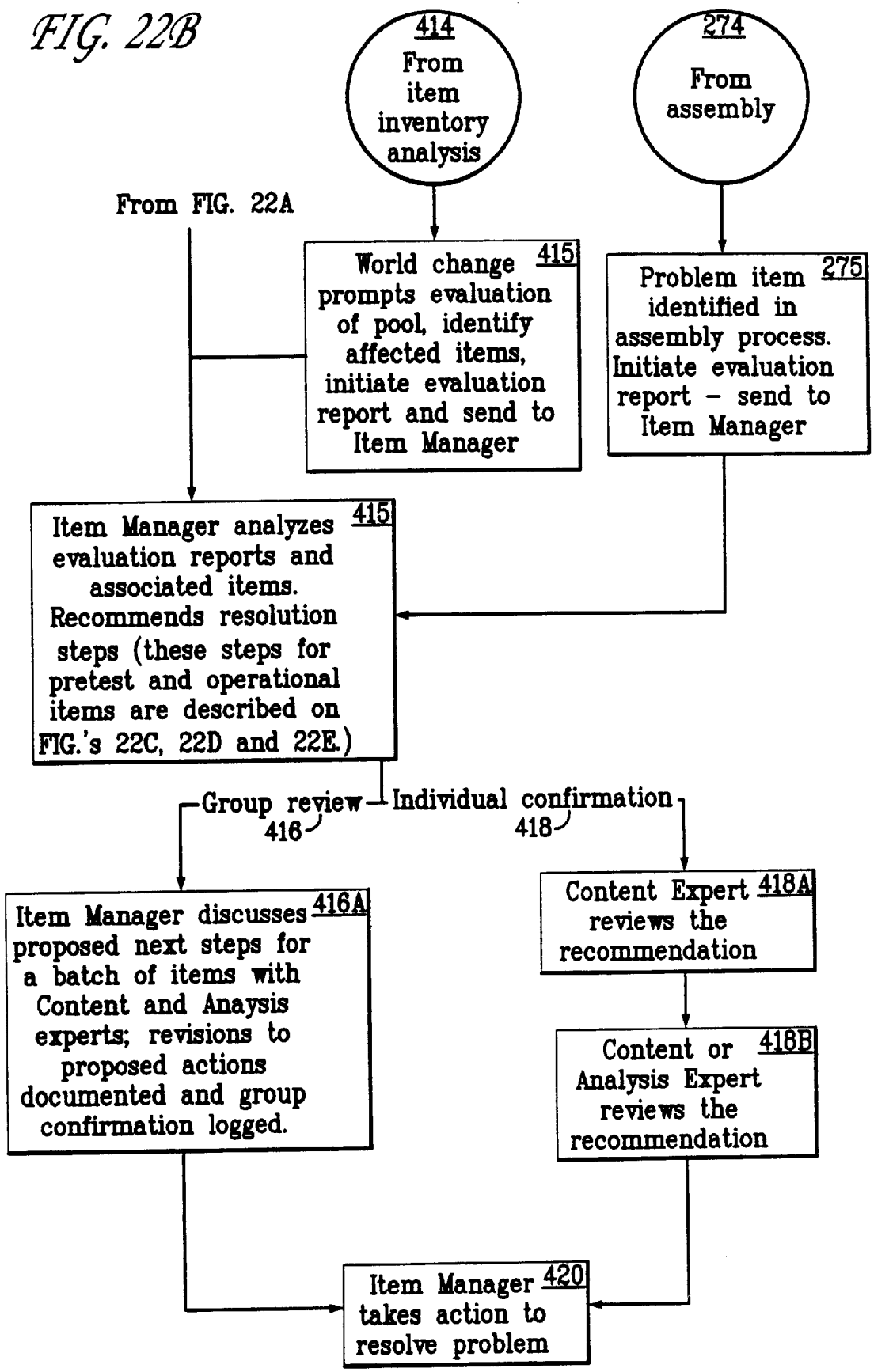

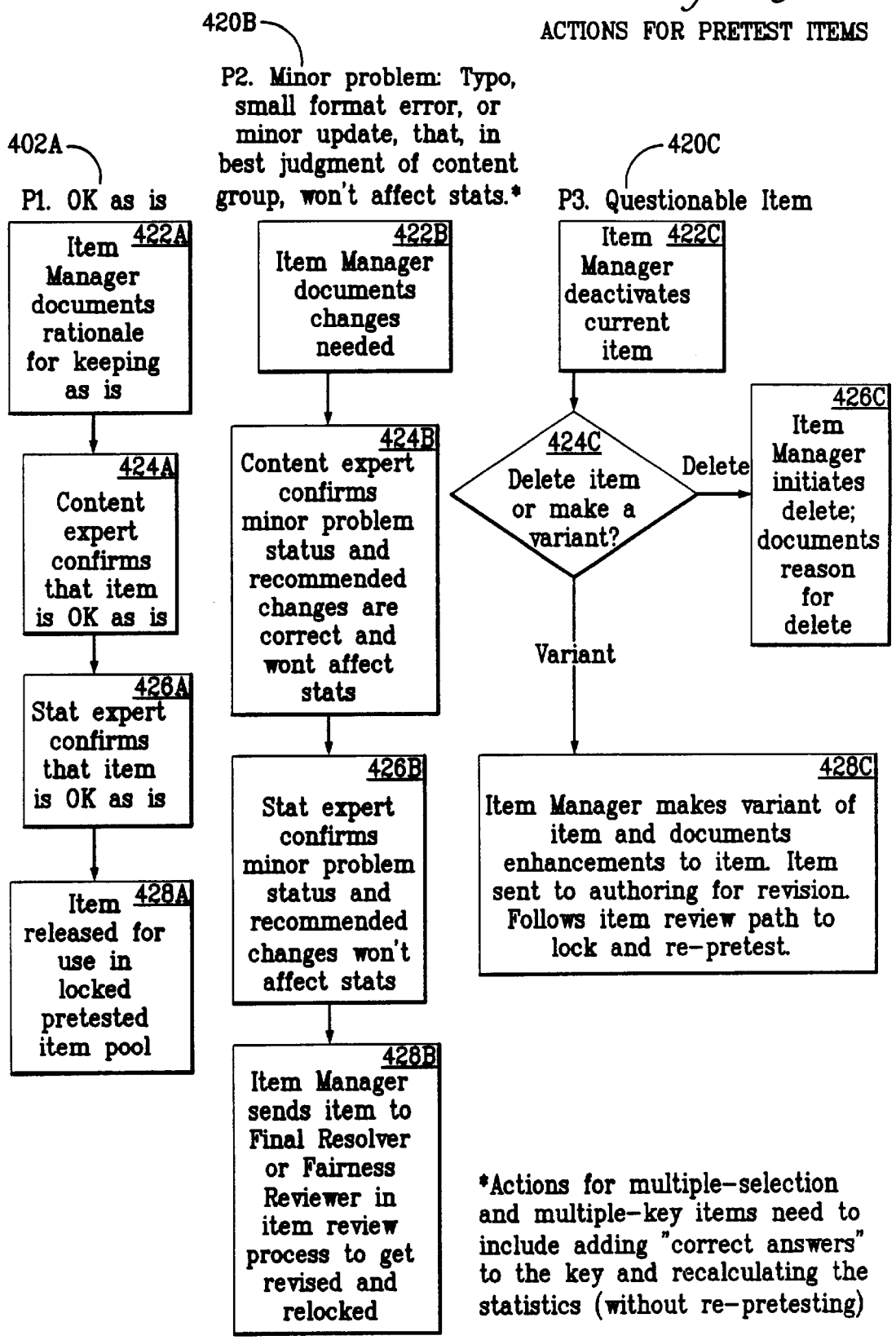

ACTIONS FOR OPERATIONAL ITEMS (cont.)

450A
F4. Item OK; remains locked in available pool; but there was a printing, composition, or administrative error, therefore change in scoring

450B
F5. Item has typo, format flaw, or is not up-to-date; change in scoring because error/update affects keyability

450C
F6. Item fundamentally indefensible; change in scoring; may be blocked for use in new assemblies; could be just a revised key.

---

452A Item Manager recommends no change to item; initiates PIN to DNS in current form

↓

454A Content expert confirms and signs PIN

↓

456A Stat expert confirms and signs PIN

↓

458A Program Director signs PIN

↓

460A PIN issued

---

452B Item Manager documents changes needed; initiates PIN to revise scoring in current form

↓

452B Content expert confirms and signs PIN

↓

454B Stat expert confirms and signs PIN

↓

456B Program Director signs PIN

↓

456B PIN issued

↓

458B Item sent to resolver in item review for relocking

↓

460B Item Manager issues pre-administration alert, if necessary

---

452C Item Manager recommends deactivating current item and making variant or just deleting; initiates PIN and DNS in current form

↓

454C Content expert confirms major problem status and recommendations; signs PIN

↓

456C Stat expert confirms major problem status and signs PIN

↓

458C Program Director signs PIN

↓

460C PIN issued

↓

462C Current item deactivated

↓

464C If variant recommended, item variant sent to item writing stage

↓

466C Item Manager issues pre-administration alert, if necessary

| Actions | Workflow Log | Use Settings | Save Settings | Create Word Object |

Item Author
▽ Identification

| Test Program: | ◇ GRE | Test Section: | ◇ GRE Quantitative Skills |
| Delivery mode: | ◇ CBT | Item Type: | ◇ Quantitative Comparison |
| Set status: | Discrete | Set Accession #: | |
| Accession #: | ZZ868006 | Based On: | ⌐ ⌐ |
| Pretest item: | Yes | Try-Out item: | No ⌐ ⌐ |
| Item Owner: | ETS | Target Lock Date: | ◇⌐ ⌐ |
| Origin: | ◇ N/A | External ID: | ⌐ ⌐ |
| Author: | Barbara Keener | Deactivated Source: | None |

▷ Word Object
▷ Comments
▽ Content Classification

*FIG. 23C*

| Actions | Workflow Log | Lock Item | CBT Viewer | Display Hist & Stats |

Lock Reviewer
▽ Identification

| Test Program: | GRE | Test Section: | GRE Quantitative Skills |
| Delivery mode: | CBT | Item Type: | Quantitative Comparison |
| Set status: | Discrete | Set Accession #: | |
| Accession #: | ZZ834192 | Based On: | |
| Pretest item: | Yes | Try-Out Test Items: | No ⌐ ⌐ |
| Item Owner: | ETS | Target Lock Date: | 03/27/97 |
| Origin: | N/A | External ID: | |
| Author: | Vivian Mann; Jeff Jenkins | Deactivated Source: | None |

Item Author

Identification

| | | | |
|---|---|---|---|
| Test Program: | GRE | Test Section: | GRE Quantitative Skills |
| Delivery mode: | PPT | Item Type: | Problem Solving |
| Set status: | Discrete | Set Accession #: | |
| Accession #: | ZZ908007 | Based On: | |
| Pretest item: | Yes | Try-Out item: | No |
| Item Owner: | ETS | Target Lock Date: | 02/20/97 |
| Origin: | N/A | External ID: | |
| Author: | | Deactivated Source: | None |

—100h

Word Object

Word Object Icon: ◇

Document

Thumbnail:

Mary had a little labm it's fleece was white as snow. Mary had a little labm it's fleece was white as snow. Mary had a little labm it's fleece was white as snow. Mary had a little labm it's fleece was white as snow. Mary had a little labm it's fleece was white as snow. Mary had a little labm it's fleece was white as snow. Mary had a little labm it's fleece was white as snow.

(A) 1
(B) 2
(C) 3
(D) 4
(E) 5

Comments

Feedback to Author

Permanent Comments:

Workflow Instructions:

Content Classification

| | | |
|---|---|---|
| Subject: | GRE Quantitative Skills | Graphic Object ID: |
| Overlap Index: | | Don't include with: |
| View Hint: | | Graphics tools: |
| Estimated Avg. Item Score: | | Word count/passage: |

Response Features:          *FIG. 23E*

Item Key & Rationale

Key:
Item Rationale:          D
Script Required:
Script text:

| Description | Classification | Sub Classification | Keywords |
|---|---|---|---|
| Subject | | | |
| Stimulus Description | | | |
| Context | | | |
| | | | |

Gender Code:                              Race Code:                    None
Culturally relevant Item:   Ne      Any Minority:                  No
User Code 1:                              User Code 2:
User Code 3:                              User Code 4:
User Code 5:                              Original Delivery Mode:   PPT Workflow Central Sub-Reviewer Needed:

Published Material Used?              Copyright request fulfilled?   No
Copyright ID:                                 Copyright Count:                    0

Version 2.0

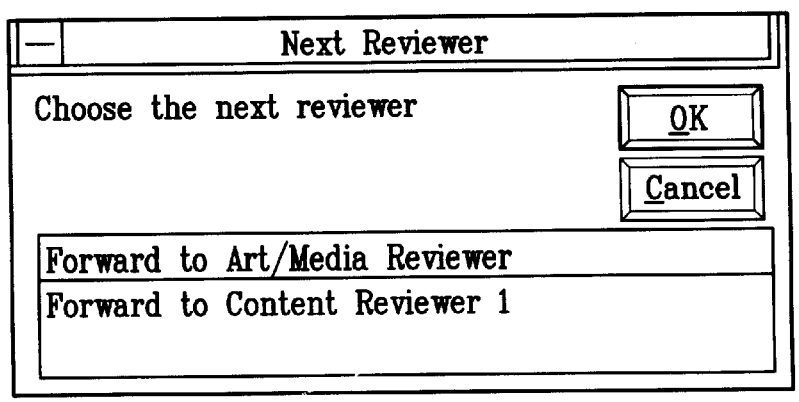

Item Migration: Format Reviewer

Identification

| | | | |
|---|---|---|---|
| Test Program | ◆ GRE | Test Session: | ◆ GRE Quantitative Skills |
| Delivery Mode | ◆ CBT | Item type | ◆ |
| Set status: | Discrete | Set Accession #: | |
| Accession #: | AM001561 | Based On: | |
| Pre-Test Item: | | Try-Out Item: | |
| Item Owner: | ETS | Migration Date: | ◆ 11/05/96 |
| Origin: | ◆ N/A | Deactivated Source: | None |
| Author: | | | |

Word Object

Word Object loan: ◆
Thumbnail:

Comments

General comments:
Let's see how big these comments are.

Workflow Instructions:
Okay, they are too big.

Content Classification

Subject:                  GRE Quantitative Skills    Graphics Object ID:
                                                                                              Graphics tools
Overlap index:                                                                                          Don't include with:
View Hint:                                                                                               Response Features:
Estimated Avg. Item Score:                                           Word count/passages:

Item Key & Rationale

Key:          D
Item Rationale:
                       .AM001561.rat

Script Required:
Script Text:

| Description | Classification | Sub Classification | Keywords |
|---|---|---|---|
| Subject | Geometry | | |
| Stimulus Description | | | |
| Context | | | |
| | | | |

FIG. 24A

Item Migration & Review:

| | | | | | | |
|---|---|---|---|---|---|---|
| 📇 Check Out | 📄 Print | ◀ Back to Main | ❓ Help | | | |

| | | Accession ○ | Item Type ○ | CODVR Mode ○ | Program ○ | Migration Date |
|---|---|---|---|---|---|---|
| Item Migration | | | | | | |
| General Views: | | | | | | |
| By Form Code | | | | | | |
| Formal | | XC001637 | (No Seq.#) | CBT | GRE | 01/22/97 |
| Art/Media | | ▼ Work in Progress | | | | |
| Proofreader | | | | | | |
| Classifier | | AM001103 | (No Seq.#) | CBT | GRE | 01/22/97 |
| By Accession | | V-097488 | (No Seq.#) | CBT | GRE | 01/22/97 |
| Formal | | ▼ Work in Progress | | | | |
| Art/Media | | | | | | |
| Proofreader | | AM000983 | (No Seq.#) | CBT | GRE | 01/22/97 |
| Classifier | | AM000986 | (No Seq.#) | CBT | GRE | 01/22/97 |
| Special Views: | | AM000988 | (No Seq.#) | CBT | GRE | 01/22/97 |
| Deactivated | | AM000990 | (No Seq.#) | CBT | GRE | 01/22/97 |
| Rejected Items | | | | | | |
| Other(s): | | ▼ HI017030 (L) | (No Seq.#) | CBT | GRE | 01/22/97 |
| All Items | | | | | | |

FIG. 25

402d Item Evaluation Report
  Trigger & Identification
410f Accession #:                    ◇ XC001614
     Test Form:                         3BGR2
     Section #:                          3
320b Item #:                             1
     Source of item challenge:       ◇ Internal Inquiry
     Reason for creating report:     ◇ Other staff
320a Stat. Resolution:               ◇ Problem statistics – need rationale to keep
     Further description of problem:   tst for patent
410b Scanned image file(s):
     Basic Information
410a
     ☐ Browse Item
     ☐ Browse Item Statistics
410c Test Program:                   Test Section:
     Set Status:                     Set Accession #:
     Accession #:  XC001614          Delivery Mode:
     Item Type:                      Lock Status:       No
     Item Usage:
410d
     Actions
410g
     Resolution Due Date:
     Confirmers Needed:              ┌─────────────────┐
                                     │ ☐ Confirmer 1   │
410e                                 │ ☐ Confirmer 2   │
                                     └─────────────────┘
410f
     General Comments:
     Item Manager's Recommendations: ◇   ┌──────────────────────────────────────────────┐
410h                                     │ ○ Pretest item OK as is                      │
                                         │ ○ Pretest item minor change (no change in stats) │
                                         │ ○ Pretest item deactivate and make variant   │
                                         │ ○ Pretest item flawed (deactivate and drop)  │
                                         │ ○ Operational item OK as is                  │
                                         │ ○ Operational item minor change (no change in stats) │
                                         │ ○ Operational item deactivate and make variant │
                                         │ ○ Operational item deactivate and drop       │
                                         └──────────────────────────────────────────────┘
410i
     Change in current scoring?
     Description of change in scoring:
410j PIN #:
     Confirmer 1's Comments:
410k Confirmer 2's Comments:

410n — Final Decision: ◆ ○ Confirm as Locked
○ Deactivate
○ Deactivate and Clone
○ Send to Fairness Reviewer
○ Send to Final Resolver
○ Send to Format Reviewer (Migration)

410p — Reason for Minor Changes:
Number of Incidents: ◆ 1

Workflow Log

Report Creator: Barbara Keener  Reporter Creator Signoff: 03/21/97
Item Manager:  Item Manager Signoff(s):
  Assigned to Confirmer 1:
  Assigned to Confirmer 2:
410l — Confirmer 1:  Confirmer 1 Signoff(s):
410m — Confirmer 2:  Confirmer 2 Signoff(s):

Analysis Feedback Review

| ◀ Back to Main | ⊙ Help |
| --- | --- |

| | ☐ Accession ▲ | ☐ Sign Status | Due Date ○ | Item Type ○ | Mode ○ | Created | Program |
|---|---|---|---|---|---|---|---|

Pre-Test

GRE Quantitative Skills

General Views:

| | ZZ502014 | Draft | 11/06/96 | Quantitative Comparison | CBT | | GRE |

Assecoler
Items Selected

Special Views:
Selected Items
Deactivated

Other(s):
All Items
Analysis

FIG. 25C

Item/Performance Evaluation:

| Create Evaluation Report | 🖉 Check Out | ▼ Back to Main | ⑦ Help | | | | |
|---|---|---|---|---|---|---|---|
| | | Accession | Test Section/Name | Form | Item | Date Created | Mode |
| Item Performance Evaluation | | | | | | | |
| General Views: | | ▶ Open | | | | | |
| Reporter Creator | | | ▶ (Not Categorized) | | | | |
| Item Manager | | | ▶ Karen Myers | | | | |
| Confirmer 1 | | | | AM000274 | K-3RGR2 | 11 | 01/21/97 |
| Confirmer 2 | | | | | | | |
| Special Views: | | ▶ Closed | | | | | |
| Deactivated | | | ▶ Sent To Final Resolver | | | | |
| Review Process Summary | | | | | | | |
| Other(s): | | | | | | | |
| All Items | | | | | | | |

402c

402b

Item Browser

*FIG. 27*

Identification

| | | | |
|---|---|---|---|
| Text Programs: | GRE | Text Sections: | GRE Quantitative Skills |
| Delivery mode: | CBT | Item type: | Quantitative Comparison |
| Accession #: | ZZ508014 | Based on: | |
| Set Status: | Discrete | Set Accession #: | |
| Item Owner: | | Target Lock Date: | 11/03/96 |
| | | Deactivated Source: | |

Origin:

Author:

Word Object

Word Object Loan:

Document

Thumbnail:

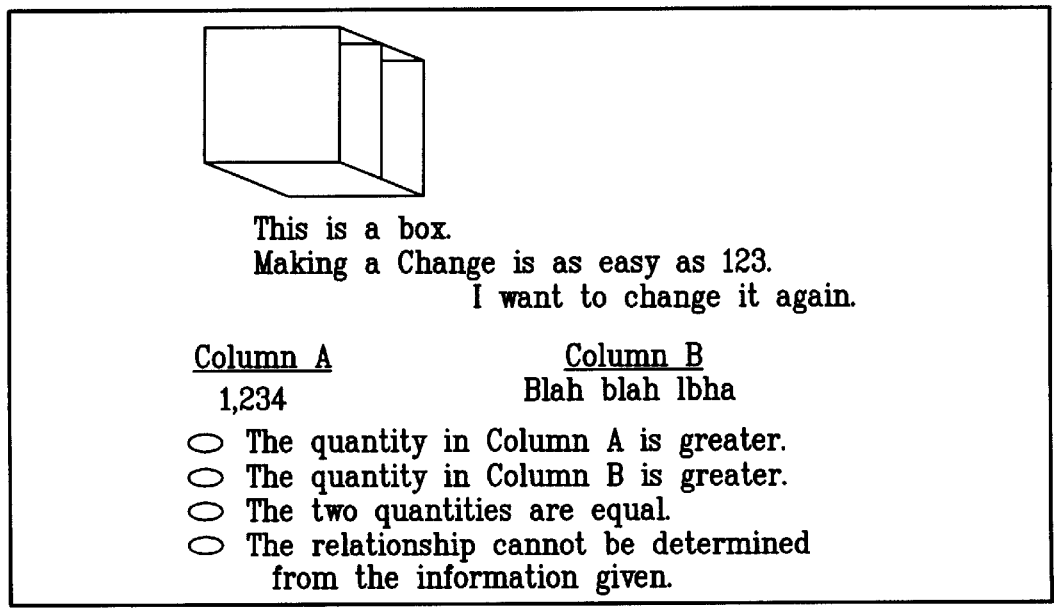

Comments

Feedback to Author:

Permanent Comments:

Workflow instructions:

Content Classification

FIG. 27A

Subject:  GRE Quantitative Skills                Graphics Object ID:
Overlap index:                                   Don't include with:
View Hint:                                       Graphics tools:
Estimated Avg. ID:                               Response Features: No
Key: C
Item Rationale:
Script Required:
Script Text:

| Description | Classification | Sub Classification | Keywords |
|---|---|---|---|
| Subject | Data Analysis | Computation-Integers | |
| Stimulus Description | | | |
| Context | | | |
| | | | |

Gender Code:        Both            Race Code:              Latino American
Culturally relevant: Yes            Any Minority:           Yes
User Code 1:                        User Code 2:
User Code 3:                        User Code 4:
User Code 5:                        Original Delivery Mode:

Locked Item Files zz506014.ctl   zz506014.g01   zz506014.ste

FIG. 28

Management and Metrics:

| Back to Metrics | Back to Management | Back to Metrics & Manag | ? Help |
|---|---|---|---|

| | | Accession | Author | Helper | Art/Med | Content | Content | Content | Art/Med | Special | Partners |
|---|---|---|---|---|---|---|---|---|---|---|---|
| | ▼ Author | | | | | | | | | | |
| Metrics: Cycle Time | ▼ CBT | | | | | | | | | | |
| Days by: | | VB107033 | | | | | | | | | |
| Review States | | VB107034 | | | | | | | | | |
| Migration States | | VB110066 | 237 | | | | | | | | |
| Try Out States | | VB110062 | 238 | | | | | | | | |
| Pre-Test States | | VB110061 | | | | | | | | | |
| Locked By: | | ZZ104715 | 1 | | | | | | | | |
| Program | ▼ Quantitative Comparison | | | | | | | | | | |
| Pre-Operations | | VB105021 | 272 | | | | | | | | |
| Rejected By: | | ZZ103831 | 12 | | | | | | | | |
| Program | | | | | | | | | | | |
| Pre-Operations | | | | | | | | | | | |

SYSTEM AND METHOD FOR COMPUTER BASED TEST CREATION

CROSS-REFERENCE TO RELATED APPLICATION

This application is a Continuation of application Ser. No. 08/826,417, filed on Mar. 27, 1997, which is currently pending in the United States Patent and Trademark Office.

FIELD OF THE INVENTION

This invention generally relates to the field of computer-based test creation systems, and more particularly, to the on-line creation of items for tests using a computer-based test creation system.

BACKGROUND OF THE INVENTION

For many years, standardized tests have been administered to examinees for various reasons such as for educational testing or for evaluating particular skills. For instance, academic skills tests, e.g., SATs, LSATS, GMATs, etc., are typically administered to a large number of students. Results of these tests are used by colleges, universities and other educational institutions as a factor in determining whether an examinee should be admitted to study at that particular institution. Other standardized testing is carried out to determine whether or not an individual has attained a specified level of knowledge, or mastery, of as given subject. Such testing is referred to as mastery testing, e.g., achievement tests offered to students in a variety of subjects and the results being used for college credit in such subjects.

FIG. 1 depicts a sample question and related directions which might be given on a standardized test. The stem 12, the stimulus 14, responses 16, and directions 18 for responding to the stem 12 are collectively referred to as an item. The stimulus 14 is the text and/or graphical information, e.g., a map, scale, graph, or reading passage, to which a stem 12 may refer.

After all of the examinees' tests are graded, statistical and other processing may be provided for various reasons. For instance, to assess one examinee's score, it is necessary to compare his or her score to those of other examinees taking the same test. Another important reason to evaluate the test results for statistical purposes is to create and update an information bank containing the performance statistics of each item used or created for previous tests. This information may then be used for the creation of future tests.

A goal of standardized testing is to efficiently construct a test for the purpose of measuring a skill, ability, etc. Therefore, each test is constructed to conform to a test specification which defines the rules and/or constraints for selecting the items. In constructing a test, test developers select items from a pool of items so that the combination of selected items satisfy the test specification.

A test is typically divided into sections of questions. The test specification generally defines the number of items to be presented in the test, the number of test sections, the number of questions in each section, the time for taking the test, and the allotted time for responding to all the items in each test section. The test specification also specifies criteria for item selection. These are based on at least four item characteristics which include: (1) item content, e.g., mathematical questions relating to arithmetic, algebra, or geometry; (2) cross-information among items, e.g., more than one item testing the same point; (3) number of items/set, i.e., identification of a subset of items of a larger set; and (4) statistical properties of items derived from pretesting, e.g. difficulty of the selected items.

In recent years, the methods for creating, delivering, administering, and scoring tests have been determined to be inadequate. Due to the number of examinees taking standardized tests, the demand for developing new and more diverse tests and a need to provide more flexibility in scheduling tests without sacrificing administration costs and security have increased. One solution to these demands would be to automate the entire testing process. Only a few attempts have been made, however, to automate only portions of the testing process. Furthermore, these attempts are limited in their ability to generate a variety of item types.

For example, a prior art test creation system, "TD/DC," is disclosed in U.S. Pat. No. 5,565,316, entitled "System and Method for Computer Basted Testing" and owned by Educational Testing Service, Princeton, N.J. The TD/DC system, however, has drawbacks in that the creation stage is not automated. During the item creation stage of the TD/DC system, all work has to be done through the use of a work folder. An item author creates an item on paper and places the paper in a work folder. This work folder is then passed from person to person for reviewing, editing or commenting on the item. The work folder finally arrives back at the original author.

Since it is not automated, the entire test creation process with the TD/DC system involves many steps and "hand-offs" of the item/work folder. For example, it has been found to take 179 hand-offs and 197 steps to create one item for the verbal section of the SAT test! Because of the hand-offs, much time is wasted waiting for a user to pass the work folder off to the next user. On the math section of the SAT test, only 22% of the elapsed time to create an item is actually spent working on that item. Moreover, on the GRE Chemistry test, 30% of the total working time is spent making transcriptions between paper and computer. An automated item creation system is desired which will streamline the item creation process by making the process more efficient and reducing the required number of steps and hand-offs.

When using the TD/DC system, it is not feasible for people to review an item at the same time to collaborate their thoughts. For one reason, there is only one copy of the item contained in the one work folder. An item creation system is thus desired which will allow several users to collaborate on a particular item at the same time.

Another drawback of the TD/DC system is that throughout the item creation process, everything is done on paper. That is, the item is created on paper, edits may be made to the item on this same sheet of paper, art work may be drawn by hand on the back of this same sheet of paper, or edits and additions may simply be added to the work folder on other sheets of paper. This makes it very difficult for a user to view the current state of the item. Moreover, a user or reviewer never sees what the item will look like until it is viewed in a completed test, either in a computer based test or a test booklet. Even when an item is finally input into a computer in an electronic form in the TD/DC system, it is only held in an unformatted text string, unable to be viewed as it would appear in an actual test. It is desirable for the item creation system to allow users to view the item as it will appear in the test.

Another drawback to the TD/DC system is that it cannot handle multimedia item types. That is, because every step of the creation process is done on paper, multimedia items such as audio, video or animation items cannot be made with the TD/DC system. It is thus desired to provide a versatile system for test creation so that it will allow for the creation of multimedia item types.

Another drawback to the TD/DC system is that evaluation of the performance of items is not efficient. For example, the TD/DC system relies on users to identify problems in items based on reviewing statistical information on items after administrations of such items in tests. It is desired to improve the efficiency of the item performance evaluation stage the test creation process, for example, by employing an automatic system of identifying items that have problems and initiating electronic evaluation reports requesting evaluation personnel to review such items and to resolve such problems.

The main object of the present invention is to address the above-noted problems with the prior art item creation systems by providing a more efficient item creation system. The prior art system, i.e., the TD/DC system, lacks efficiency in that much of it is still paper based, it involves numerous steps and hand-offs, it lacks automatic or automated steps, and the item is never viewed as it is intended until it is present in its final form, i.e., in the computer based test or in a test booklet. Because many currently used items are in the TD/DC electronic format, another object of the present invention is to allow for the conversion of items from the TD/DC system into an electronic form that can be used in the present item creation system as if it originated there. Thus, not only is the present invention designed to address the drawbacks of the prior art TD/DC system, but also to improve all aspects of test creation so as to yield an automated and efficient computer-based test creation system with several automatic features.

SUMMARY OF THE INVENTION

The present invention provides a computer-based test creation system and method for generating test items. An item creation and review subsystem is provided for creating items for storage in an item repository. The item creation process comprises the steps of electronically associating components of a test item into an electronic item form, storing the electronic item form in the item repository, accessing the electronic item form from the item repository to review the content and format of the electronic item form, and storing the electronic item form in the item repository as a locked item when the content and format are deemed acceptable for inclusion in a test. Until the electronic item is "locked," it may be modified as desired by the reviewers participating in the creation of the item.

An item performance evaluation subsystem is provided for evaluating the performance of the items after the administration of the items with the use of electronic evaluation reports. The item performance evaluation process includes the steps of electronically compiling the feedback from the administration of the items to test takers, electronically reviewing the feedback, identifying any problems in the test items, and resolving any problems in the test items.

The preferred embodiment of the invention includes an analysis feedback review subsystem for identifying items that do not meet predetermined performance criteria after the administration of the items to test takers and initiating evaluation reports for these items. The preferred embodiment of the invention also includes an item migration and review subsystem for converting items from the prior art TD/DC system into the electronic form of the test creation system. The preferred embodiment of the present invention further includes a metrics and management subsystem for checking the status and monitoring the progress of items throughout the item creation process.

An additional feature of the invention, that of statistical flags, is provided to automatically initiate evaluation reports for those items that do not meet the predetermined performance criteria. Another feature of the invention, present in the item creation and review subsystem, is a means for creating a plurality of multi-media item types. An additional feature of the invention, that of a pre-administration alert function, provides an alert notification if a problem item, i.e., one that was just subjected to a change in status through the item performance evaluation process, appears in any currently assembled tests.

BRIEF DESCRIPTION OF THE DRAWINGS

The present invention will be better understood, and its numerous objects and advantages will become more apparent by reference to the following detailed description of the invention when taken in conjunction with the following drawings, of which:

FIG. 1 is an example of a written test question or "item" and related directions.

FIG. 4A is a user interface screen for the object database.

FIG. 5 is a "Copyright Information" form.

FIG. 5A is the user interface screen for the copyright database.

FIG. 6 is a "Test Form—Main" form.

FIG. 6A is the user interface screen for the test form database.

FIG. 7 is a "Test Form—Section" form.

FIG. 8 is a "Test Type" form.

FIG. 8A is the user interface screen for the test type database.

FIG. 9 is a "Test Section" form.

FIG. 10B is a "History" form.

FIG. 10C is the user interface screen for viewing the history of a pretest item in the statistics database.

FIG. 11 is an "IA" (Item Analysis) form.

FIG. 11A is the user interface screen for viewing IA statistics for pretest items awaiting review and for accessing the IA form.

FIG. 12 is a "DIF" (Differential Item Performance) form.

FIG. 12A is the user interface screen for viewing DIF statistics for pretest items awaiting review and for accessing the DIF form.

FIG. 13 is an "IRT" (Item Response Theory) form.

FIG. 13A is the user interface screen for viewing IRT statistics for pretest items awaiting review and for accessing the DIF form.

FIG. 14 is the user interface screen for the parameters database.

FIG. 15 is the user interface screen for the Accnums database.

FIG. 16 is the user interface screen for the Test Creation Help database.

FIG. 17 is a template for an item.

FIGS. 22A–22E depict a detailed flow diagram for the item performance evaluation process.

FIG. 23B is the user interface screen for accessing the item creation and review subsystem.

FIGS. 23C, 23D and 23E depict the "Item Author" form.

FIG. 23F is a "Lock Reviewer" form.

FIG. 23G is the user interface screen for routing an item to the desired reviewer in the item creation and review subsystem.

FIG. 24 is an "Item Migration: Format Reviewer" form.

FIG. 24A is the user interface screen for accessing the item migration and review subsystem.

FIG. 25 and 25A depict an "Item Evaluation Report" form.

FIG. 25B is the user interface screen for analysis feedback subsystem.

FIG. 25C is the user interface screen for item performance evaluation subsystem.

FIGS. 27 and 27A depict the "Item Browser" form.

FIG. 28 is the user interface screen for the metrics and management subsystem.

DETAILED DESCRIPTION OF THE PREFERRED EMBODIMENTS

A. Test Creation System (TCS) Overview

Figure 2:
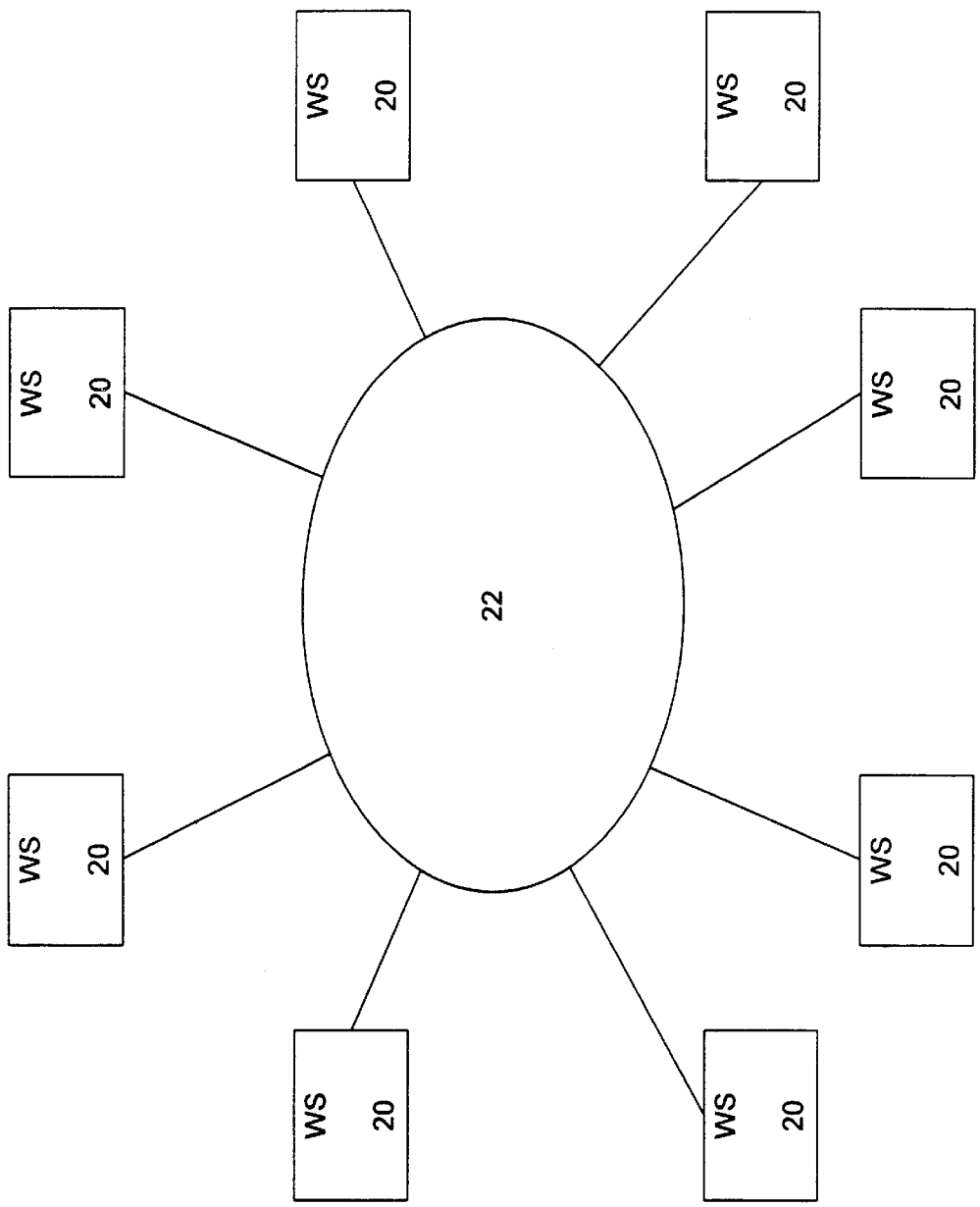
FIG. 2 is a general overview of the TCS (test creation system) facilities of the invention.

In the drawings, wherein like numerals represent like elements, there is illustrated in FIG. 2 a general overview of the test creation system ("TCS") facilities of the invention. As illustrated, the TCS operates through the use of computer terminals or workstations 20, all electronically connected together via a network 22 through which the TCS is accessed. The primary users of the TCS operate at these workstations 20: item authors create new items; item reviewers review existing items; inventory managers manage items and pools of items; and statistical analysts evaluate the performance of items. It should be understood, however, that any number of workstations 20 may be used by the TCS.

Figure 3:
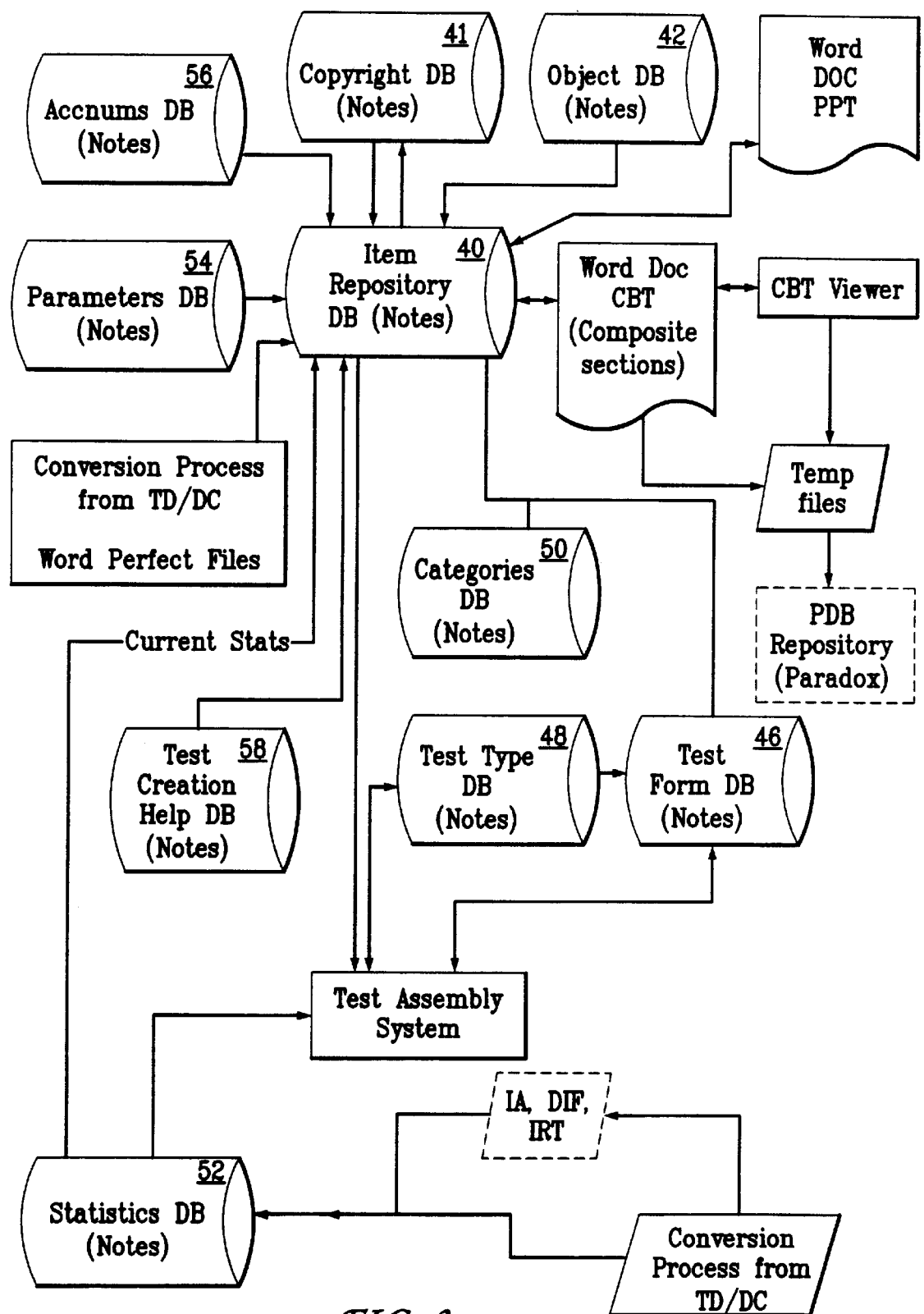
FIG. 3 is a system block diagram of the software elements of the TCS of the invention.

A system block diagram of the software elements of the TCS of the invention is shown in FIG. 3. As illustrated, the TCS includes ten databases 40, 42, 44, 46, 48, 50, 52, 54, 56, and 58. The primary database is the item repository 40. The remaining databases carry supporting information and are all linked to the item repository 40.

The item repository 40 is the database where items are authored, reviewed and stored for future use. All pertinent information is stored about an item, including identification information, classification information, an item thumbnail sketch, statistical information, and management and audit trail information.

Figure 4:
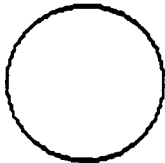
FIG. 4 is a sample "Object Record" form.

The object database 42 provides a repository of generic objects such as graphs, maps, and pictures, that can be used in creating an item. Using "cut and paste" techniques, an object can be transferred from the object database 42 to the item text in the item repository 40. New generic objects can also be created here by using an "Object Record" form, a sample of which is shown in FIG. 4. The user interface screen for viewing the object database 42 and accessing the Object Record form is shown in FIG. 4A.

In FIG. 3, the copyright database 44 connects the Copyright Department to the item creation process. When an item author working in the item repository 40 initiates a copyright review, information is automatically sent to the copyright database 44. Notification of copyright approval is then returned to the item repository 40 once approval is obtained. A sample "Copyright Information" form is shown in FIG. 5. The user interface screen for viewing the copyright database 44 and accessing the Copyright Information form is shown in FIG. 5A.

In FIG. 3, the test form database 46 provides information regarding a test form used for a test administration. There are two forms associated with the test form database. The first form, "Test Form—Main," a sample of which is shown in FIG. 6, provides high level information about a test, including test program 46a, delivery mode 46b, test edition 46c, and number of sections 46d. The user interface screen for viewing the test form database 46 and accessing the Test Form—Main form is shown in FIG. 6A. The "Test Form—Section" form, a sample of which is shown in FIG. 7, carries information specific to the section, as there typically are several sections within a Test Form.

In FIG. 3, the test type database 48 provides generic information regarding a test and includes two forms. The "Test Type" form, a sample of which is shown in FIG. 8, contains high level information regarding a test such as the test medium 48a and number of sections 46d. The user interface screen for viewing the test type database and accessing the Test Type form is shown in FIG. 8A. The "Test Section" form, a sample of which is shown in FIG. 9, contains information regarding a section, such as the type of section 48b and the allowable response types 48c.

In FIG. 3, information from the test type database 48 is linked to the item repository 40 through the test form database 46. This information is reflected in the subsystems of the item repository 40 in pull-down responses for appropriate fields. Information from the test type database 48 is also automatically populated in the test form database 46 when a new "Test Form" is created. The test type database 48 also provides information regarding role conflicts within the item review process for a test. For example, if an item author is not allowed to be a content reviewer, the role conflict is set in the test type database 48.

In FIG. 3, the categories database 50 contains four different types of information: dimensions, categories, structural category, and workflow, used to populate "Item Author" forms (shown in FIGS. 23C–E and discussed in detail below) of the item repository 40.

In FIG. 3, the statistics database 52 is the repository for statistics collected from the back-end systems. The statistical information from the statistics database 52 is linked to the item repository 40. The statistics for an item are linked to that item and are used in the "analysis feedback review" and "item performance evaluation" subsystems (discussed in detail below) within the item repository 40. There are several types of statistics captured for an item: History, which provides information on the test(s) in which the items have been used; DIF (Differential item Performance), which shows the performance of the item between different groups, e.g., male/female; IA (Item Analysis), which provides an analysis regarding the number of test takers selecting each possible response and the difficulty of the item; and IRT (Item Response Theory), which provides additional information regarding item performance.

Figure 10:
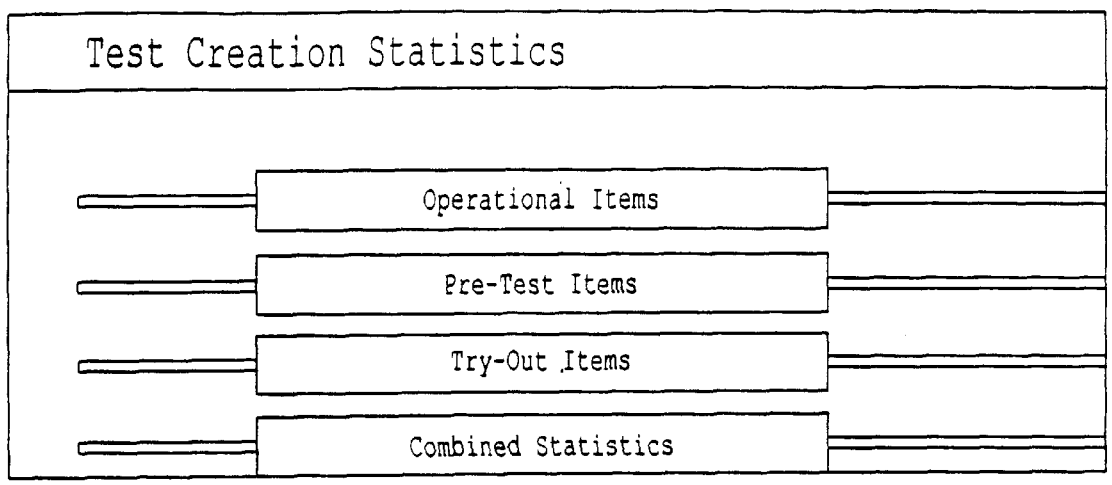
FIG. 10 is the user interface screen for accessing the statistics database.
Figure 10A:
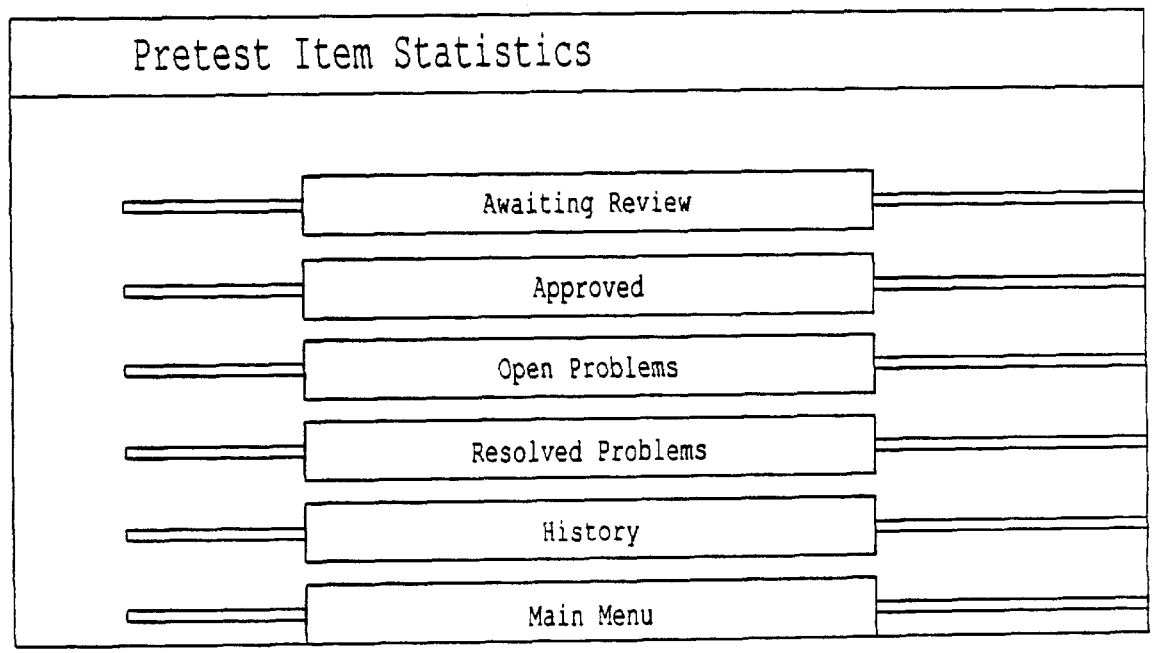
FIG. 10A is the user interface screen for accessing Pretest Item Statistics.

Statistics are gathered on pre-test, try-out, and operational items. The user interface screen for accessing the statistics database is shown in FIG. 10. Pre-test and try-out items are those items that are being tested for usability in a test. Operational items are those items that contribute to a score for the test. Within the category of pre-test, try-out or operational, a statistic can be in one of several states: approved, awaiting review, and open or resolved problems. The user interface screen for accessing Pretest Item Statistics is shown in FIG. 10A. Item History includes information pertinent to the test form in which an item is used. There can be several history records per item, depending on the number of forms, and the use of the item in the form. Additional information is carried in the "History" form, a sample of which is shown in FIG. 10B. The user interface screen for viewing the history of a pretest item in the statistics database 52 and for accessing the History form is shown in FIG. 10C.

The item analysis view includes most critical information used to evaluate item performance. There will be one item analysis ("IA") record for each usage of an item. Additional information is carried in the "Item Analysis" form, a sample of which is shown in FIG. 11. The user interface screen for viewing IA statistics for pretest items awaiting review and for accessing the IA form is shown in FIG. 11A.

DIF provides a comparison of item performance between different populations: White/Black; Male/Female; White/Hispanic; White/Asian American; White/American Indian. Unlike the other statistics, which have one record for each use of an item, DIF information is accumulated within one record. Additional information is carried in the DIF form. A sample "DIF" form is shown in FIG. 12. The user interface screen for viewing DIF statistics for pretest items awaiting review and for accessing the DIF form is shown in FIG. 12A.

IRT provides additional information regarding the performance of an item. An IRT record is created for each use of an item. A sample "IRT" form is shown in FIG. 13. An IRT record is created for each use of an item. The user interface screen for viewing IRT statistics for pretest items awaiting review and for accessing the IRT form is shown in FIG. 13A.

All movement of statistics from one category to another, e.g., from awaiting review to approved, is accomplished within the Item Performance Evaluation subsystem in the item repository 40, which will be explained in more detail below.

Figures 14, 15, 16:
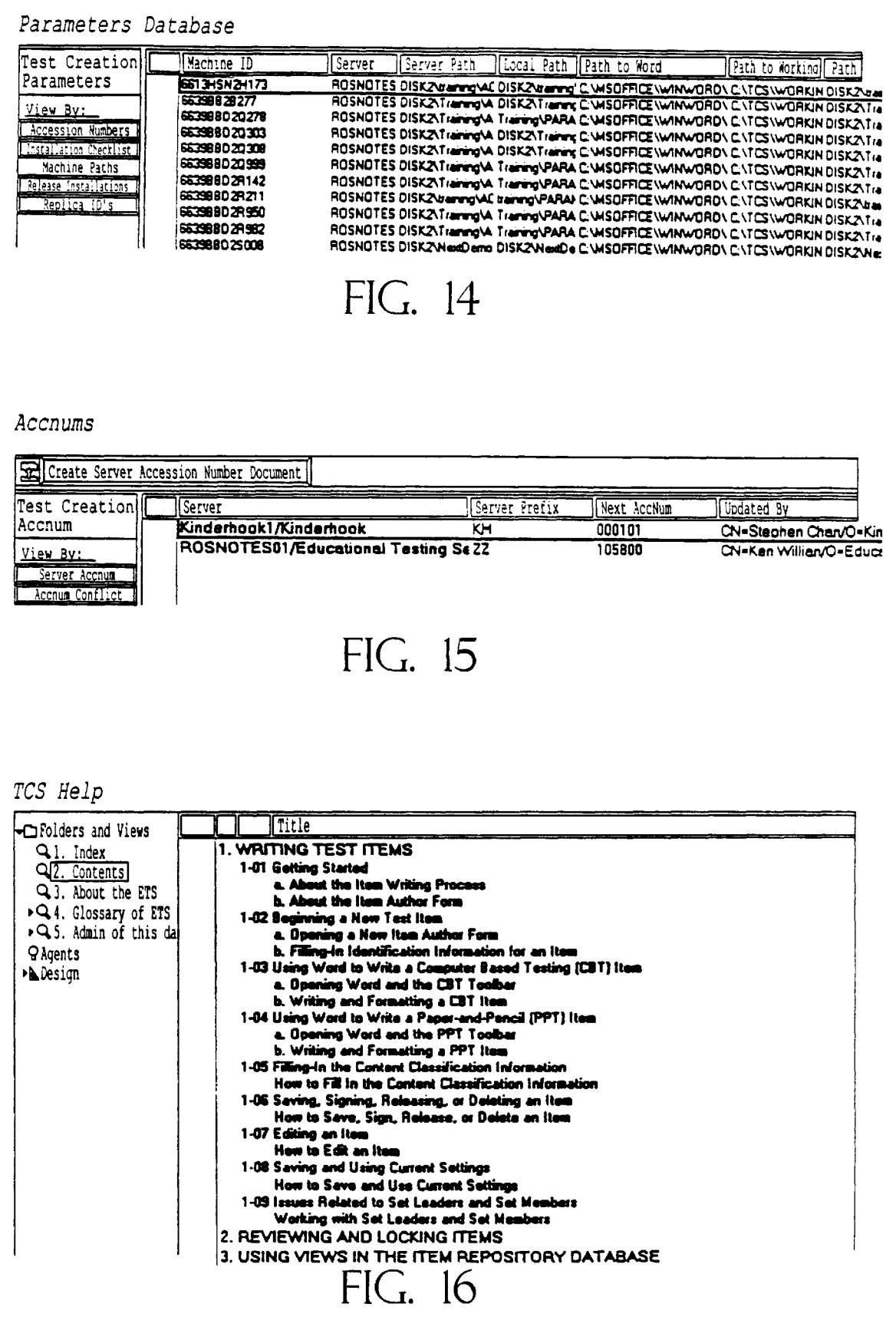

In FIG. 3, the parameters database 54 contains information used in the installation and set up of the TCS such as a checklist of procedures for installation of the document management databases and supporting structures and procedures for assigning accession numbers. The user interface screen for viewing parameter information and accessing the parameters database 54 is shown in FIG. 14.

The Accnums database 56 provides information used to control the assignment of accession numbers, the unique identifiers for items, within the TCS. The user interface screen for viewing accession number information and accessing the Accnums database 56 is shown in FIG. 15.

An additional database, the Test Creation Help database 58, provides documentation of the processes within the TCS. For example, a "Help" document may provide step-by-step directions for writing a test item with the TCS. The Help database also provides a glossary of terms used within the test creation process. For example, a "Glossary" document may provide the definition for the term "administration date" as well as additional information such as "workflow information." The user interface screen for viewing the Test Creation Help database and accessing a Help document or a Glossary document is shown in FIG. 16.

The software used in the preferred embodiment of the TCS is Microsoft's Words, and the proprietary Word™ tools consist of a series of templates and macros that link the Word™ documents with the documents of the document management software. The document management software used in the preferred embodiment of the TCS is Lotus Notes™.

Lotus Notes™ passes information regarding the test program, test section, item type and delivery mode to Word™. Word™ uses this information to provide the appropriate template for constructing an item. Once the author/reviewer completes the writing/reviewing process and closes the Word™ template, critical information, such as the item key, i.e., the answer, is passed back to Lotus Note™, and the Word™ document is attached to a corresponding Lotus Notes™ document. A sample Word™ Template is shown in FIG. 17.

B. The Overview of the Item Repository

Figure 18:
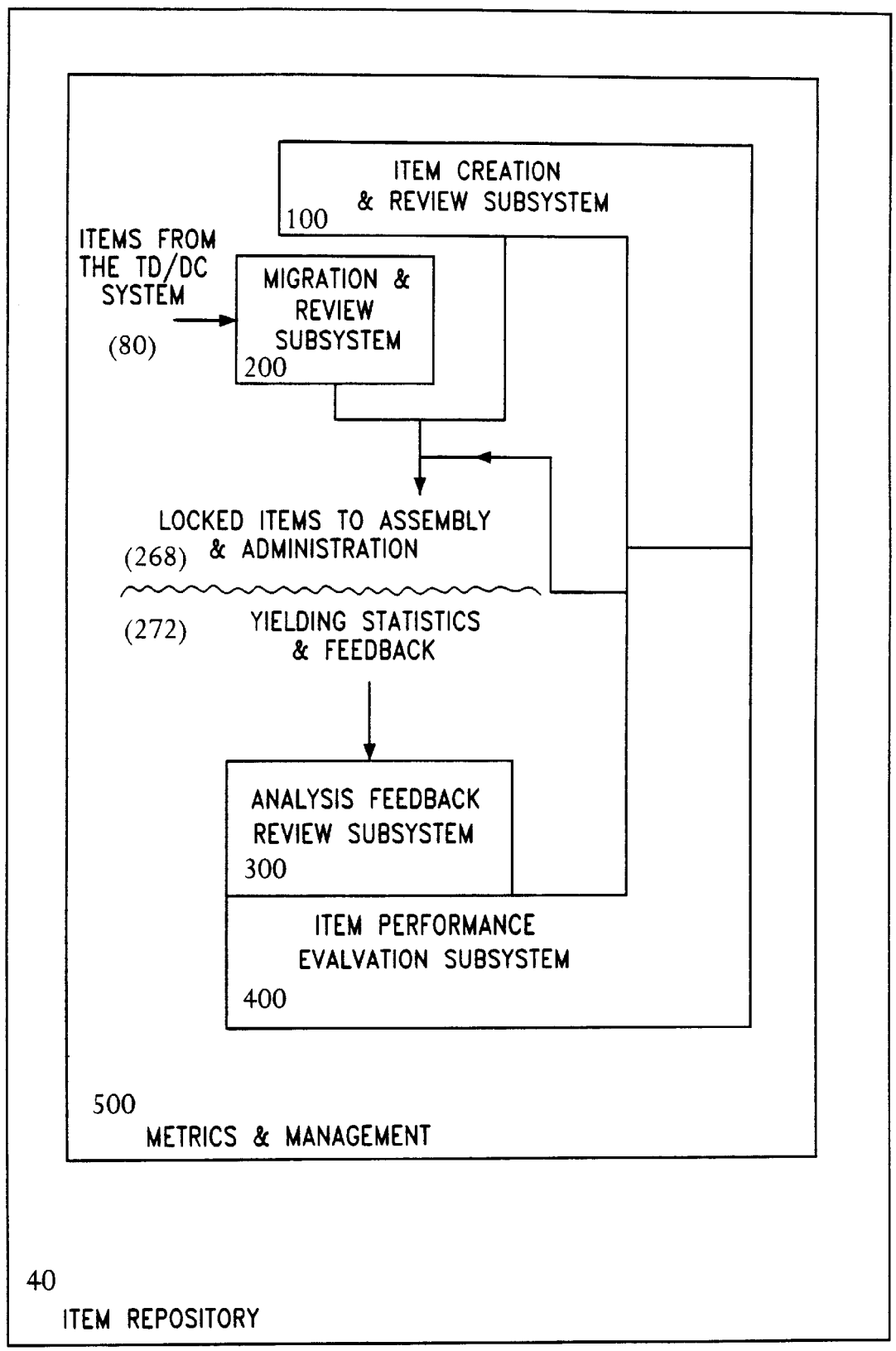
FIG. 18 is a block diagram of the interfaces of the TCS subsystems of the invention.

A block diagram depicting the interfaces of each of the TCS subsystems in the item repository 40 is shown in FIG. 18. As illustrated, the TCS comprises: (1) an item creation and review subsystem 100 for generating a test item in electronic form; (2) an item migration and review subsystem 200 for (a) converting items from the TD/DC system 80 to the electronic form of the TCS and for classifying these items, yielding locked items ready for assembly and administration (268); (3) an analysis feedback review subsystem 300 for reviewing statistics and feedback 272 from the administration of items; (4) an item performance evaluation subsystem 400 that reviews the statistics and more substantive feedback from the administration of items and identifies, analyzes and resolves problems found in items of the TCS; and (5) a metrics and management subsystem 500 for monitoring the progress of items throughout the creation process. All of these subsystems are contained in the item repository database 40.

Figure 19:
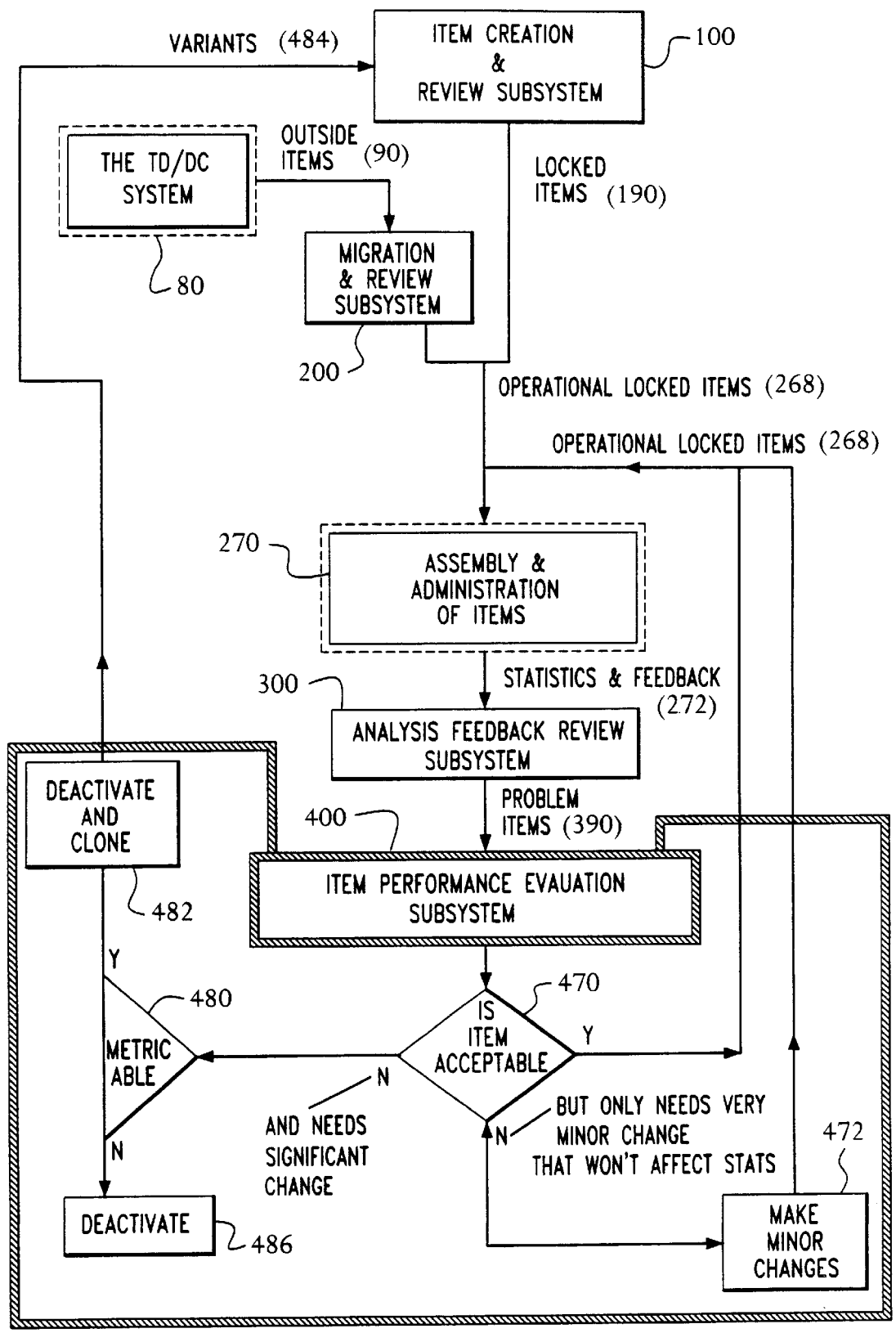
FIG. 19 is a high level functional flow diagram of the TCS of the invention.

A high level functional flow diagram of the TCS is shown in FIG. 19. As shown, the item creation and review subsystem 100 produces locked items 190 that are ready for administration. The outside items 90 are existing items from the TD/DC system 80 that are sent to the migration and review subsystem 200 and converted to the TCS format by the migration and review subsystem 200.

The item migration and review subsystem 200 converts items from the TD/DC system 80 to the electronic format of the TCS and classifies these items. Thus, the item creation and review subsystem 100 and the item migration and review subsystem 200 produce operational locked items 268 that are ready for assembly into tests and administration (270).

Statistics and feedback 272 following administration of the items are then routed to the analysis feedback review subsystem 300 for review. In particular, problem items 390, i.e., items that do not meet predetermined performance criteria, are identified here and routed to the item performance evaluation subsystem 400. Personnel using the item performance evaluation subsystem 400 review the statistics and feedback 272 for each problem item 390 in order to evaluate the item and resolve the problem.

Once an item reaches the item performance evaluation subsystem 400, there are four possible routes for the item to take. The first determination is whether the item is acceptable (470) even though the statistics are not good, i.e., do not meet the predetermined performance criteria. If the item is acceptable, it is routed back to the pool of operational locked items 268 for use in a subsequent administration. If the item is not acceptable, but only needs a very minor change that will not affect its statistics, then the minor change is made (472) and the item is routed back to the pool of operational locked items 268 for use in a subsequent administration. If the item is not acceptable and needs a significant change, a determination of whether it is workable 480 is made (480). If the item is workable, i.e., can be used in some manner, then it is deactivated and a variant is made (482). This item variant 484 is routed back to the item creation and review subsystem 100 to yield another locked item 190. On the other hand, if the item is deemed not workable, then it is deactivated (486).

C. The Subsystems of the Item Repository

1. The Item Creation and Review Subsystem

The item creation and review subsystem 100 creates fully reviewed, fully formatted, fully classified, test-ready items, The TCS process is intended to complete all content and publishing work on items during the item creation stage. This differs from the TD/DC system for which items are worked on by content staff, publishing staff, and outside committees at many points during the item writing and reviewing stage as well as the test assembly stage.

The TCS process concentrates the work of item creation into a shorter period of elapsed time, while giving writers, reviewers, publishers, and outside committees sufficient opportunity to improve the items. This TCS process means that content staff will be signing off an item as "OK-to-print" at the end of the item writing and reviewing stage, not at the end of the test assembly process. This concentration of revisions and improvements in the item creation stage (i.e., in the item creation and review subsystem) provides several key benefits over the prior art in that it: (1) eliminates the cost and time of making and reviewing late changes; (2) reduces the risk of introducing errors late in the process; and (3) greatly speeds up test assembly and layout time.

The TCS supports writing, reviewing, and publishing of items through the use of item templates, initiated in the item creation and review subsystem 100, for providing: (1) automated formatting, linking capability to graphics software so that artwork can be stored and reviewed with the item text; (2) camera-ready quality of text and graphics for all reviewers, thus eliminating the need for sheets of paper and work folders; (3) a connection to the Copyright Department for sending permission requests; (4) automatic routing to the appropriate stage, thus eliminating logging procedures; (5) batch-approval capabilities; (6) electronic maintenance of item records and history; and (7) inventory-management screens that can be used to make informed decisions about work assignments by accurately assessing the size and balance of item pools, and to follow up on work that is running late.

All reviews of items and all publishing work on items will take place in the item creation and review subsystem 100. Items will be locked after all reviews and revisions have taken place. During the entire item creation and review process, each item will appear on the screen as it will be formatted in a test booklet or in a computer-based test (CBT) package. CBT and paper-and-pencil test (PPT) items, as well as item types of other media, will be handled in the same way in all aspects of item authoring, classifying, and inventory management in the same software environment. There will be no parallel paper and electronic tracks during item creation; the electronic version will serve as the official version. The Test Creation System also provides several ways of tracking variants and related items.

Figure 20A:
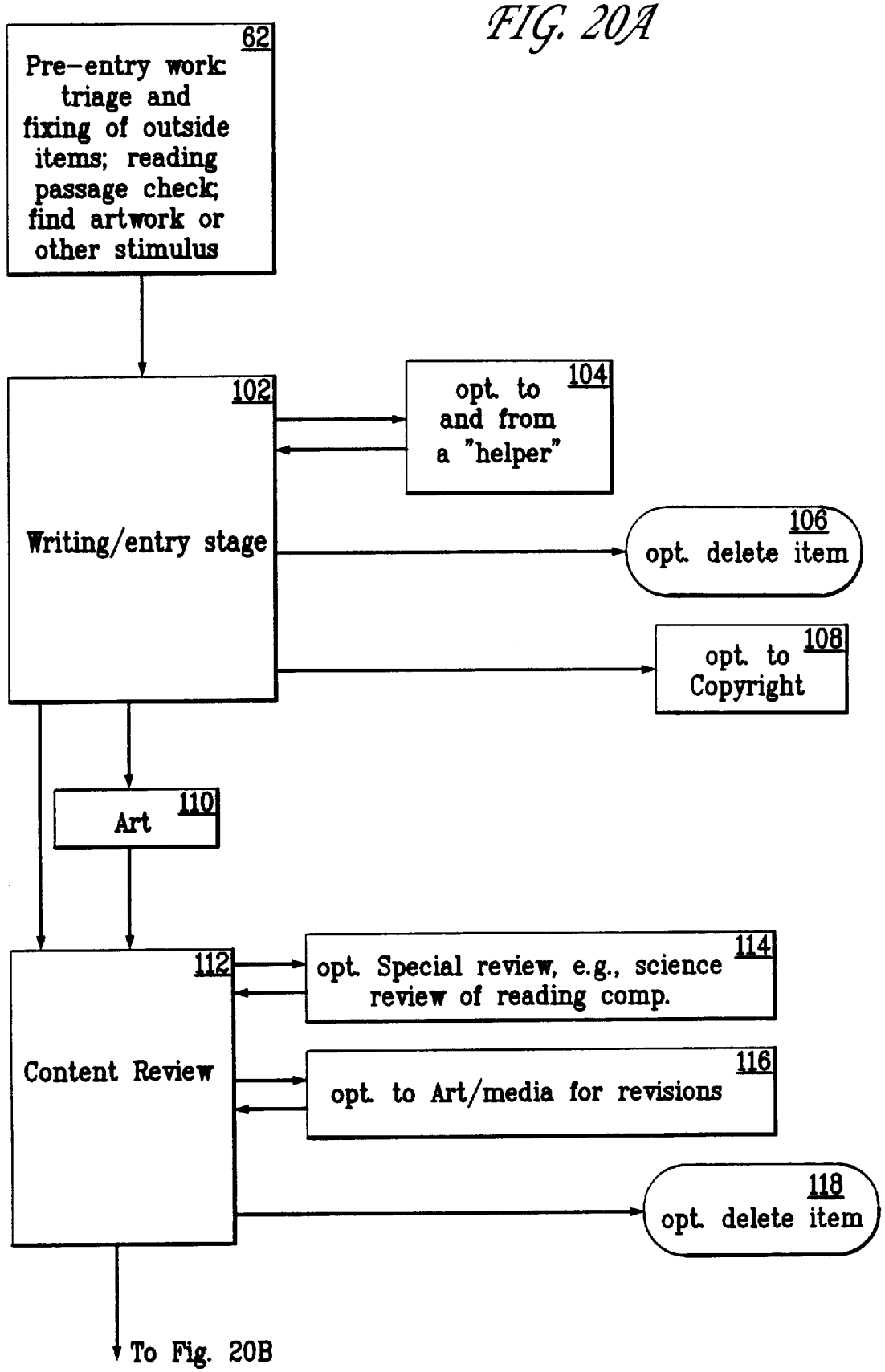
FIGS. 20A and 20B depict a detailed flow diagram for the item creation and review subsystem.
Figure 20B:
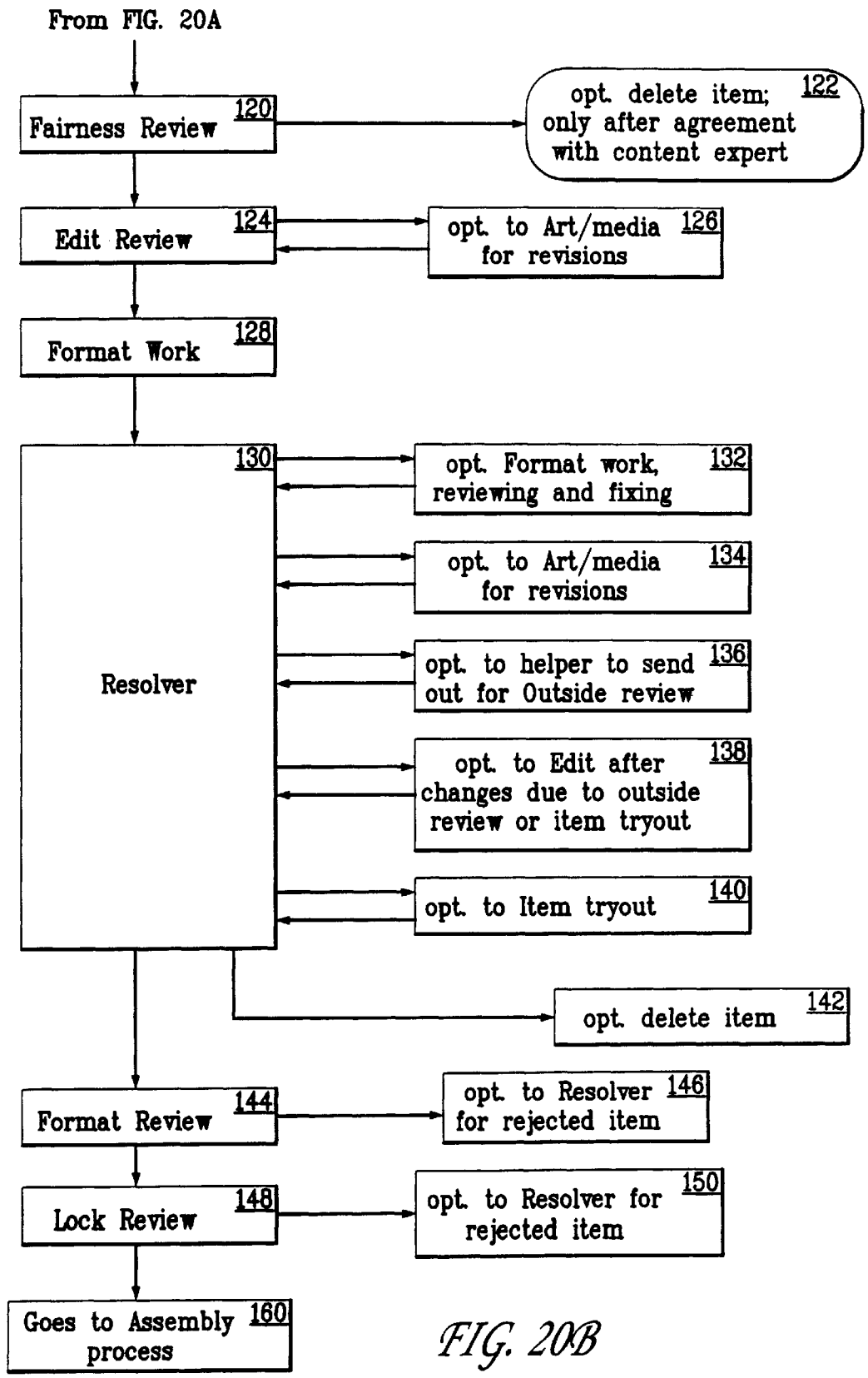

A detailed flow diagram for the item creation and review subsystem 100 is shown in FIGS. 20A and 20B. Some steps of the item creation and review process take place before there is interaction with the Test Creation System. This pre-entry work 62 comprises: the triage and fixing of items already developed by outside personnel; checking passages for reading comprehension questions; and finding artwork or other stimuli where needed.

The next stage is the writing/entry stage 102 that comprises entry of text and preliminary art in the electronic item form, i.e., the template (FIG. 17). Some writers will want to type their items directly into the TCS as they conceive them; others will not.

Regardless of how the item is generated or whether it is typed by the writer into the system or not, the item must be complete and, in the judgment of the item writer, have a good chance of becoming a test-ready item. Items and sets must be reasonable and not missing any of their parts (except finished artwork) before being signed off from the writing/ entry stage 102.

If during the writing/entry stage 102, a related written or printed document must be saved, e.g., a complex stimulus or rationale on paper from an outside item writer, it is scanned and attached to the item record by a "helper" 104. To accomplish this, the item is routed to a "helper" 104 from the writing/entry stage 102 and then returned when complete.

During the writing/entry stage 102, source information is entered for copyright purposes. If an item or stimulus requires copyright permission or needs an expert decision as to whether permission must be requested, the original source can be scanned and attached to the item record, and the item is flagged for copyright work. This item is then routed to the Copyright Department 108. Here, a copyright specialist either marks it as a "fair use" or extracts the necessary information and requests permission from the copyright owner (FIG. 5, "Copyright Information" section). The copyright process takes place on a parallel track to the other item work; the item is not held up to wait for copyright approval.

Once everything required is entered into the item form at the writing/entry stage 102, the electronic version of the item is proofed against any paper originals. The paper copies can be discarded as the electronic version is now the official document. Note that at this stage 102, and various other stages of the writing and review subsystem as well as the other subsystems of the item repository, there is an opportunity to delete the item (106) from the TCS.

After the writing/entry stage 102, the item can be routed to the art department 110 if it needs artwork or other media work where it is checked out by a graphic artist/specialist. The art/media specialist completes the work on the stimulus, using preexisting artwork when possible, and saves all artwork in an artwork library for possible future use. When the stimulus is done, the specialist signs off on the item and the item is electronically routed to content review 112.

If the item is not routed to art 110, it is routed directly to content review 112. It is during this stage that the vast bulk of item improvement must occur. Because the items already have high-quality artwork and format, the content reviewers should be able to concentrate on aspects of the item such as soundness, clarity, and keyability, i.e., how well the key (correct response) works. During the content review stage 112, all of the following must be checked and, if need be, improved: single best answer (for multiple choice items); all distracters wrong (for multiple choice items); skill(s) or knowledge in the test's domain; currency; clarity of wording, including checking the fit between stem and options; elimination of overlap among options; simplification of overloaded stems; elimination of unnecessary or repetitive words; elimination of specific determiners of key subject and sensitivity classifications; rationales, if any; and scoring guide, if any.

Content reviewers may copy the item onto an item's electronic "scratchpad" to try out revisions. If the revised version is acceptable, this version can be copied into the item record.

Typically, there are three content reviews in the content review stage 112 with a maximum of three sign-offs to ensure efficient review. Two or more reviewers are able to electronically collaborate with each other regarding an item from their respective workstations. As an example, the first reviewer reviews the item, makes suggestions for revising it in the electronic scratchpad, and signs off. Another reviewer reviews the item and the first reviewer's suggestions and suggests further improvements or makes notes about other problems. These two reviewers meet, agree on changes, make the changes, and the second reviewer signs off. A third reviewer reviews the item and makes improvements to the item, conferring with one or both of the earlier reviewers as necessary.

At the content review stage 112, any of the content reviewers can route the item to special review 114, e.g., for review of a reading passage by a science specialist. A reviewer may also route the item to an art/media specialist 116 for changes in the artwork. The item may also be deleted (118) as desired.

When the content review stage is complete, the item should be sound, clear, keyable, i.e., ready for a test from the perspective of content. After the last content reviewer signs off, the item is electronically routed to Fairness Review 120, shown in FIG. 20B. Here, a fairness reviewer checks out the item and conducts the fairness review of the item and classifications, combining the sensitivity guidelines, that pertain to words or phrases that may be inappropriate for a segment of the population, and the DIF (Differential Item Performance) guidelines. The reviewer writes recommendations for changes in the comments field and, if necessary, clicks a "sensitivity alarm" icon. If a content expert agrees, unacceptable items may be deleted (122).

From fairness review 120, the item is routed to edit review 124. Here, an editor checks out the item and conducts the edit, making comments in the electronic scratchpad. The editor also has an opportunity to route the item to art/media 126 for edits to artwork.

From edit review 124, the item is routed to format work 128. Here, a format expert checks out the item and completes the formatting of the item, if necessary-.

From format work 128, the item is routed to the resolver 130. Here, a resolver, who is one of the content reviewers who is familiar with the item, reviews the edit and fairness comments, making appropriate changes. The resolver consults, if necessary, with those who conducted these reviews. For example, if the sensitivity alarm was clicked, the resolver needs to consult with the fairness reviewer.

The resolver 130 checks that the item is as good as one can make it, in preparation for item lock, i.e., testing. For items requiring copyright permission, the resolver checks that permission has been obtained. He/she enters the wording for the credit line, if necessary, and decides with an art/media specialist 134 how any change to the artwork will be incorporated.

The resolver 130 may route the item a number of different ways, depending on the process designed for the content group and item type: (1) to a format specialist 132 for special format work; (2) to a helper 136 to prepare for committee or outside review through the mail or a meeting; (3) to the "item tryout" pool 140 for small-scale pretesting; or (4) to edit 138 after revisions based on outside review 136 or item tryout 140. Item tryout is a sub-category of "pretesting" that is conducted non-operationally on small numbers of students, producing statistics that are not considered reliable enough for reporting scores but are helpful for assembly and for revising items. Item tryout takes place before lock review. The item may also be deleted (142).

From the resolver 130, the item is routed to format review 144. Here, a format expert reviews the item for format. The expert cannot change the item. Thus, if a mistake is found, the item is routed back to the resolver (146).

From format review 144, the item is routed to lock review 148. Lock review 148 is the equivalent to a determination of whether it is "OK-to-print." It is the final review of the item for aspects such as keyability and soundness.

For skills items with external expertise, the lock reviewer is an internal staff member. For subject test items, the resolver will have already resolved final committee changes; the lock review is a final internal sign-off. If the item is fine, the lock reviewer signs off. If the item is flawed, the lock reviewer rejects the lock, writes comments, and routes the item back to the resolver (150). After lock review 148, the locked items are now ready for assembly into pretests, final forms, or pools (160).

Figure 23A:
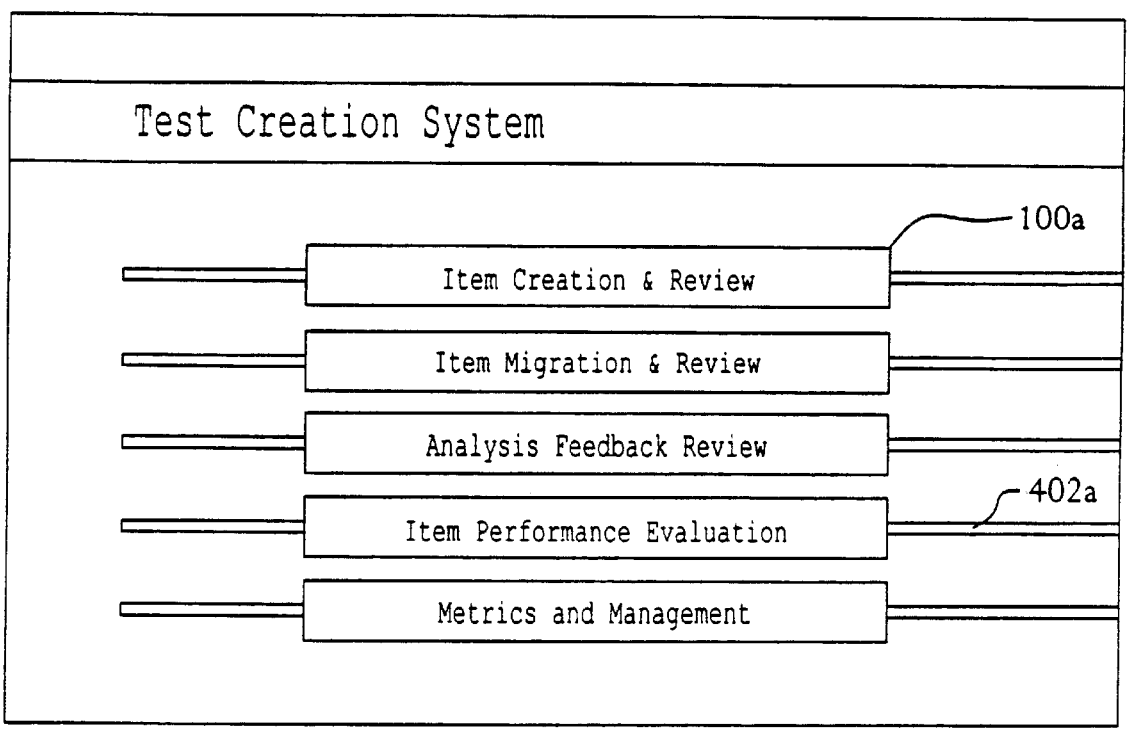
FIG. 23A is the primary menu screen for the item repository.
Figure 23B:
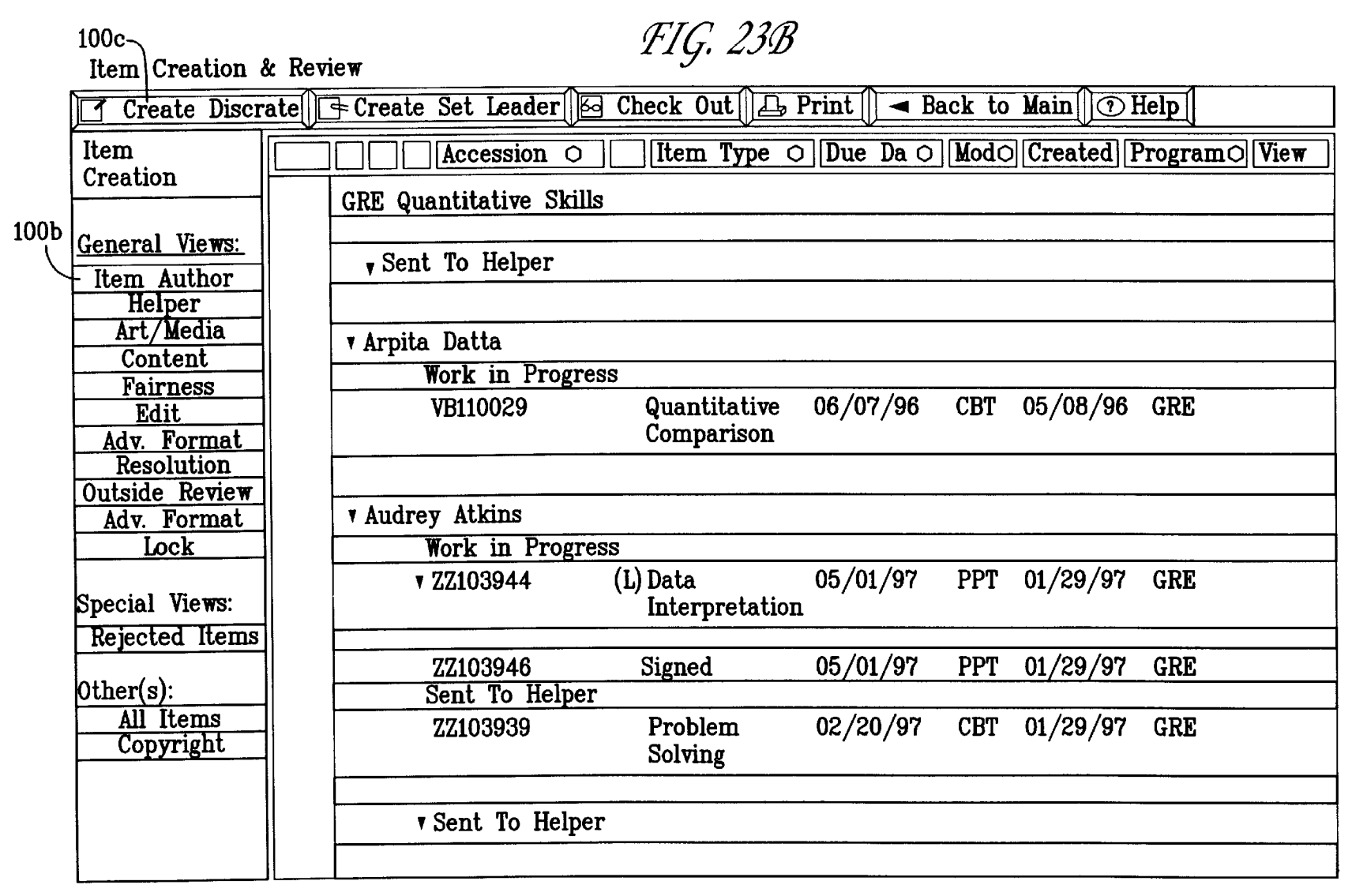

To demonstrate the mechanics of the TCS, a more detailed description of initial steps of the item creation and review subsystem follows. When an item author logs on to the TCS from his or her workstation, the primary menu screen for the item repository is displayed, as shown in FIG. 23A. The author then selects "Item Creation & Review" 100a to gain access to the item creation and review subsystem 100. The user interface screen for accessing the item creation and review subsystem, shown in FIG. 23B, then appears. As shown in FIG. 23B, the item author view 100b is the default view or stage of the item creation and review subsystem 100. The other views, or general views, are provided in the column on the left hand side of the screen, where the item author view 100b is on the top of the column. The author selects "create discrete" button 100c on the row of action buttons on the top of the screen to create a blank item author form.

The "item author" form, shown in FIG. 23C, is thereby created and an accession number is automatically assigned for that item. The author then fills in the test program 100d, test section 100f, delivery mode 100e and item type 100g fields for the item. Once these four fields are provided, and the "Create Word Object" action button 100w is selected, the correct template is generated based on this information. An example of this template, which allows all items to exist in substantially the same electronic form, is shown in FIG. 17.

The text of the item is then entered. For items with a stimulus, an initial version of the stimulus is created by one of the following methods: (1) scanning in a picture or sketch; (2) using graphical software to create the image; or (3)

describing the stimulus in words. The item then appears as it would appear in a test in the "Word Object" section 100*h* of the item author form, as shown in FIG. 23D.

As mentioned above, the categories database 50 (as shown in FIG. 3) is interfaced with the item repository and contains four different types of information: dimensions, categories, structural category, and workflow. Dimensions provide the information populated in the classification grid of the item author form as shown in FIG. 23E. The "Subject" classification fields are automatically populated based on the test program 100*d*, test section 100*f* and delivery mode 100*e* (FIG. 23C). The remaining selections are displayed in drop-down menus based on the "Subject" classification. Categories provide values for drop down menu selections for other classification fields in the "Item Author" form.

The structural category provides information on the structure of the item, such as delivery mode, style information, stimulus type, and item type definitions. Some of these fields provide values for drop-down menu selections for fields in the item author form. Information in the item type definitions structural category is passed from the item repository to Word™, in order to determine the correct Word™ template. Workflows define the start and new states for all review steps in the item repository 40. These are used to facilitate the automatic routing in the review process.

All routing, either automated or automatic, is effected electronically. Certain optional routing functions are accomplished through the use of action buttons, mentioned above in reference to FIG. 23C. Action buttons differ, and are used for various actions, depending on the stage/state/view in which the electronic item form is located.

For example, as shown in FIG. 20A, when an item completes the writing/entry stage 102, the item may be routed to either art 110 or to content review 112. To perform this routing function, the author, who is working on the item in the item author form, selects the "Actions" 100*i* action button as shown in FIG. 23C. The resulting screen is shown in FIG. 23G. From this screen, the author can route the item to the desired reviewer. Action buttons as they appear on the "Lock Reviewer" form, used in the lock review stage 148 (FIG. 20B), are shown in FIG. 23F.

2. The Item Migration and Review Subsystem

The item migration and review subsystem 200 is primarily designed to facilitate an efficient migration of items from the TD/DC system to the new TCS. Content, Publishing, and Test File Library staff will play the crucial roles in this process, from the initial batching and scheduling of the migration to the final proofing and classification of the items. It is anticipated that, for any given test, there will not be one huge migration batch, but rather smaller batches over time, as dictated by careful planning.

PPT (paper and pencil test) items as well as CBT (computer-based test) items from the TD/DC system will also be converted to the electronic form of the TCS. PPT items will require work on formatting, proofing and classifications.

Because different word processors, i.e., other than Word™, are used in the TD/DC system, the text for all items will automatically be converted to Microsoft Word™ and the items will be reformatted. The new system also uses its templates to format items, so converted item text will need to be cut and pasted into the templates of the TCS. Because some of the art software currently used in Test Publishing may not be compatible with Object Linking and Embedding (OLE) technology, pieces of artwork may need to be redone. OLE is the technology used in the TCS that allows the artwork to be stored directly with the item in the same item record.

CBT items will require only an abbreviated migration process, because the format of the items will not need to be formatted or changed. New item records will be created for the CBT items in the TCS, but classification is the only work that will need to be performed.

An item must satisfy all of the following conditions to be a candidate for item migration. The item must be ready for assembly, i.e., changes to content are not needed; content changes cannot be made during or after migration. The item must have already been administered in a test (pretest or final form). Therefore, items that have been created in the TD/DC system do not qualify. If an item is from the TD/DC system, its record must be stored on the central TD/DC database in an "edit mode."

Items will be migrated by form/section (pretest or final form) or package within the content/program area. For example, PPT and CBT items can be packaged in groups to be migrated, where a group can be set up by either content, e.g., math, or by program, e.g., GRE. An item is migrated only once; items appearing in multiple tests will be converted with items from the first test migrated. Only the most current version of an item will be migrated.

For TD/DC items, all statistics belonging to an item will be copied from the TD/DC system and stored in the statistics database of the TCS. For computer-based items, required statistics residing in a system outside of TD/DC will also be attached to the item record. Items that have. gone through the migration process are routed to the repository of locked items ready for assembly.

Figure 21A:
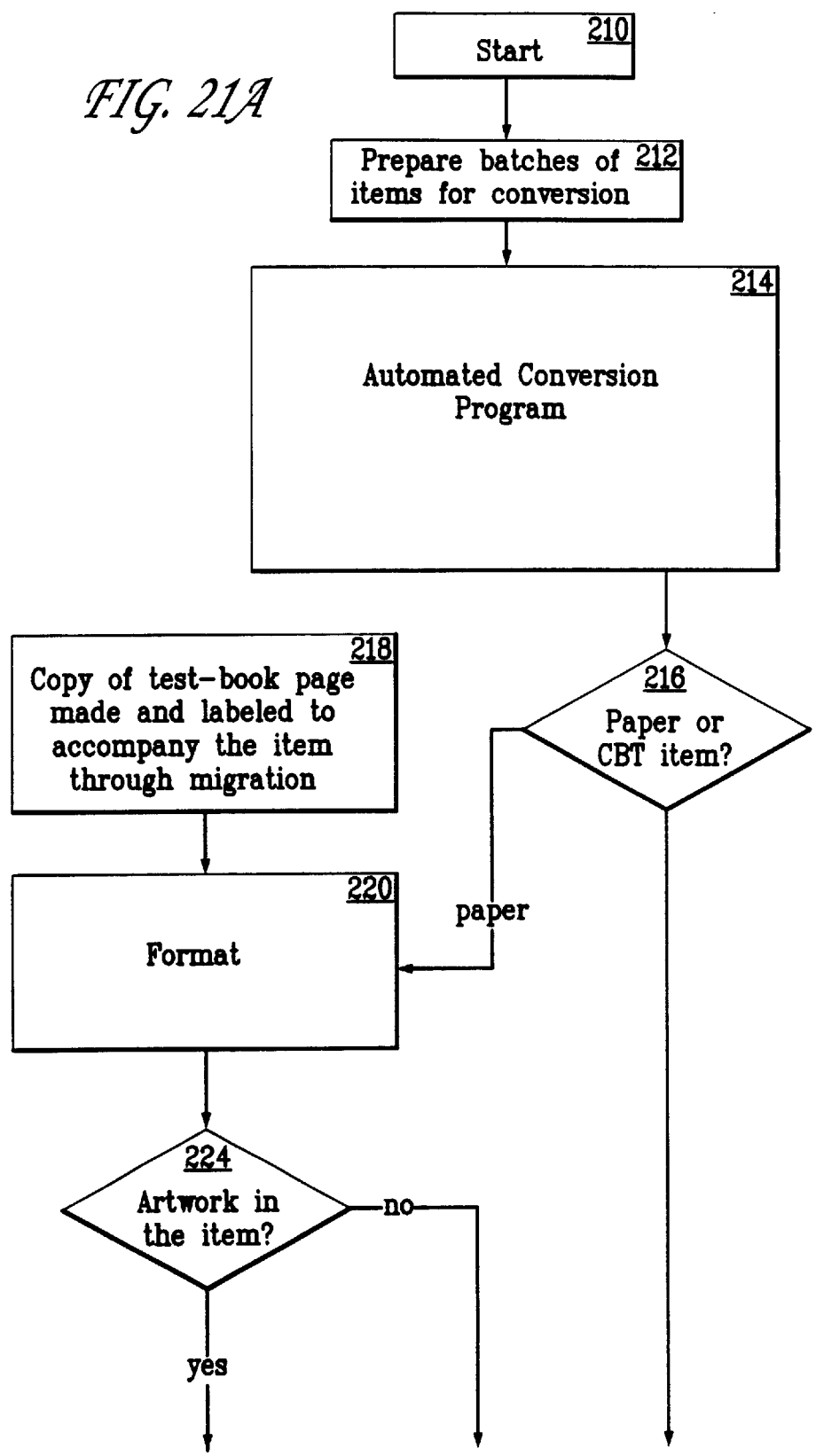
FIGS. 21A and 21B depict a detailed flow diagram for the item migration and review subsystem.
Figure 21B:
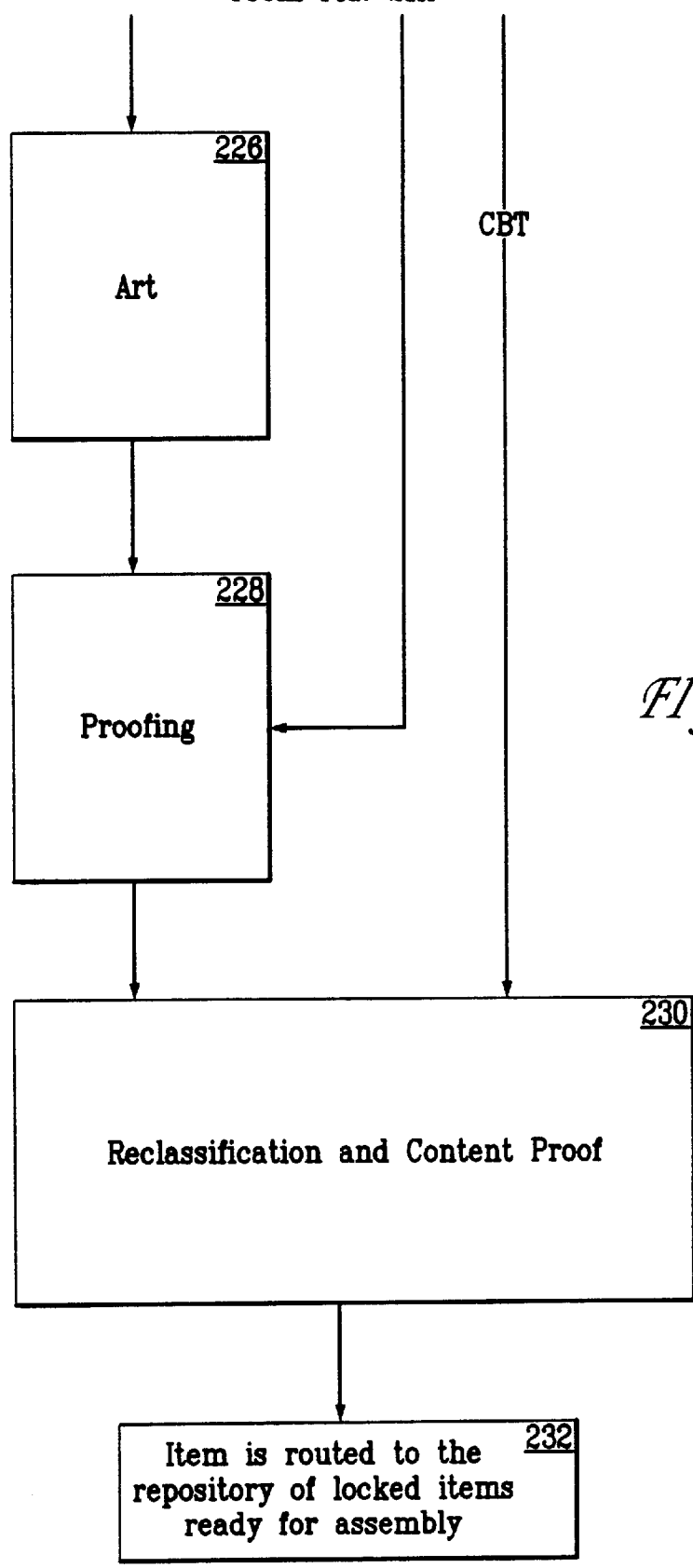

A detailed flow diagram for the item migration and review subsystem 200 is shown in FIGS. 21A and 21B. As shown in FIG. 21A, migration starts with planning according to a decision-making process designed by an item migration design group (210). Batches of items are then prepared for conversion (212) and these batches are electronically routed to the automated conversion program 214.

Batches of items are sent through the automated conversion program (214) as follows: (1) an item record is created in the item repository and an accession number is retained; (2) for PPT items, converted item text is stored as a word object in the item record; (3) For CBT items, a presentation file of the item from the CBT production group database is copied and stored in the new item record; (4) statistics are copied from the TD/DC system and stored with the item; (5) information from copyright, general comments, and rationale fields are copied from TD/DC and stored in the new item record; (6) classification codes are copied and stored with the item; and (7) a record of the key for the item, i.e, the correct response, is copied and stored in the item record.

The next step is to route the item according to whether it is a PPT item or CBT item (216). PPT items are routed to a Format step 220. Prior to format work, however, a copy of the page from the test-booklet is made and labeled to accompany the item through migration (218). This page is sent to Format step 220. Here, a formatter copies the item text into a Word™ template, adjusts the format as needed, and corrects any conversion mistakes. A sample "Item Migration: Format Reviewer" form is shown in FIG. 24. The user interface screen for accessing the item migration and review subsystem is shown in FIG. 24A.

If it is determined at 224 that the item needs artwork, it is routed to Art 226 (FIG. 21B). Here, an artist copies the existing file of artwork into the item template or creates a new, matching artwork in the template and format it to the correct size. On the other hand, if the item does not need artwork, it is routed to Proofing 228. Here, a proofreader compares the new version to the test booklet copy, checks the key record, makes typing corrections, and routes the item back to a formatter or artist, as needed, before signing off.

When the originally PPT item gets signed off from proofing, the item is routed to reclassification and content proof 230, as are CBT items from the automated conversion program 214 (FIG. 21A). Here, a content staff worker classifies the item according to the new classification structure and check the item for format. If changes are needed, the worker asks an artist or formatter to make the corrections. When this worker signs off on the item, it is routed at 232 to the item repository as a locked item 268 ready for assembly.

3. The Analysis Feedback Review Subsystem and the Item Performance Evaluation Subsystem.

The analysis feedback review subsystem 300 and the item performance evaluation subsystem 400 work together in the item evaluation process. The item performance evaluation process is the final step in the TCS. This process is used to collect and review feedback from the administration of a test, identify problem items, and take the necessary steps to resolve the problems. Evaluation of item performance begins after the administration of a batch of items, i.e., from pretests and operational test or operational CAT (Computer Adaptive Test) pools and is completed within a period of time negotiated among a Test Creation Team and Analysis and Content groups.

The basic mechanism of this process is the creation of an electronic "evaluation report" to request that experts evaluate an item in light of test administration results. An evaluation report (FIGS. 25 and 25A) can be generated on the grounds of statistics, a SIR (student irregularity report), a candidate inquiry, or something a staff member has discovered about a change that affects one or more items in the pool. The item manager, a role performed by a content expert, makes recommendations about what to do with an item that has an evaluation report and electronically routes the item to other experts or meets with other experts to make the final decision about the item's disposition.

Records of PINs (problem identification notices) are maintained in the "evaluation report." The PIN process comprises making changes to the scoring on an item in its current use and the logging and tracking of responses to SIRs and candidate inquiries. The item record is permanently linked with any of its evaluation reports, so that staff can view the report(s) at any time during the life of the item.

In order to keep the pool of available locked items as robust as possible, it is crucial to perform the item performance evaluation process very soon after the administration, i.e., more toward the end of the item creation process in which the items are administered, rather than at the beginning of a later test creation cycle when items are needed for a new assembly.

Some benefits of the item performance evaluation process of the TCS are: (1) the integration of information such as item statistics, SIRS, candidate inquiries, etc. on the item's performance in a test administration; (2) electronic records of decisions about items, i.e., with the electronic evaluation report, thus, no need to keep and file paper records; (3) cross-referenced databases, so that one can look up any past history of item performance evaluation for an item; (4) a centralized role of item manager for keeping track of item evaluations and for ensuring that problems are resolved; (5) common process steps and software support across programs, but with flexibility to accommodate different needs; (6) a user-friendly categorization of problems with items, i.e., each category has descriptors that define the problem, and the appropriate action steps to resolve the problem; (7) use of electronic statistical flags to automate the initiation of evaluation reports; (8) a "pre-administration alert" function which provides information to the item manager if a problem item appears in any currently assembled forms.

Not all pretest and operational items will be manually evaluated through the item performance evaluation process after administration. Because of all the work done on the item during the item creation and review process, any item with an adequate statistical profile, as defined by the test creation team, and with no inquiry-related problems will be considered ready to reside in the pool of locked items available for future assembly and will not enter this portion of TCS workflow.

For any item that is flagged for evaluation, it should fall into one of four categories:

1. No change to the item. The item is available for future use in its current state.
2. Minor chances to an item. "Minor change" is defined as a correction of typographical error, a small formatting change, the updating of verb tense when there has been a historical event that alters the item's currency, or a small change in punctuation. An item must be acceptable prior to the minor change and there must be a very strong reason to expect that the item's statistics will not be affected by the change. The accession number of the item will not be changed and the original, previously locked version will not be maintained in the system.
3. Other chance to an item. Any other change to an item requires that a new item be created. The current accession number will be "deactivated," i.e., blocked from use in future assembly, and the item will be re-created with the necessary modifications under a new accession number and sent to the item creation and review subsystem. The relationship to the old item will be maintained by a "document link" to the old item.
4. Deactivating an item. If an item is found to be seriously flawed, it will be deactivated.

The analysis feedback review subsystem 300 is used to identify items with poor statistics that need further evaluation and to initiate evaluation reports for those items. This work is done using views of the statistics in the statistics database. Item statistics are retrieved from TD/DC (for migrated items) and from IA (item analysis) "downloads" (for recently administered items). Analysis staff will create evaluation reports for items with unsatisfactory statistics. The user interface screen for the analysis feedback subsystem is shown in FIG. 25B. These reports are then automatically routed to the item manager for review and resolution (FIG. 25C). In addition, statistical flags will automatically initiate evaluation reports. Items with satisfactory statistics will not generate evaluation reports.

The item performance evaluation subsystem 400 is used by content staff to initiate evaluation reports based on SIRs, candidate inquiries, or other feedback from the administration. A Staff Assistant identifies the affected item by accession number. The initiated evaluation report is then routed to the item manager for review and resolution.

Figure 22A:
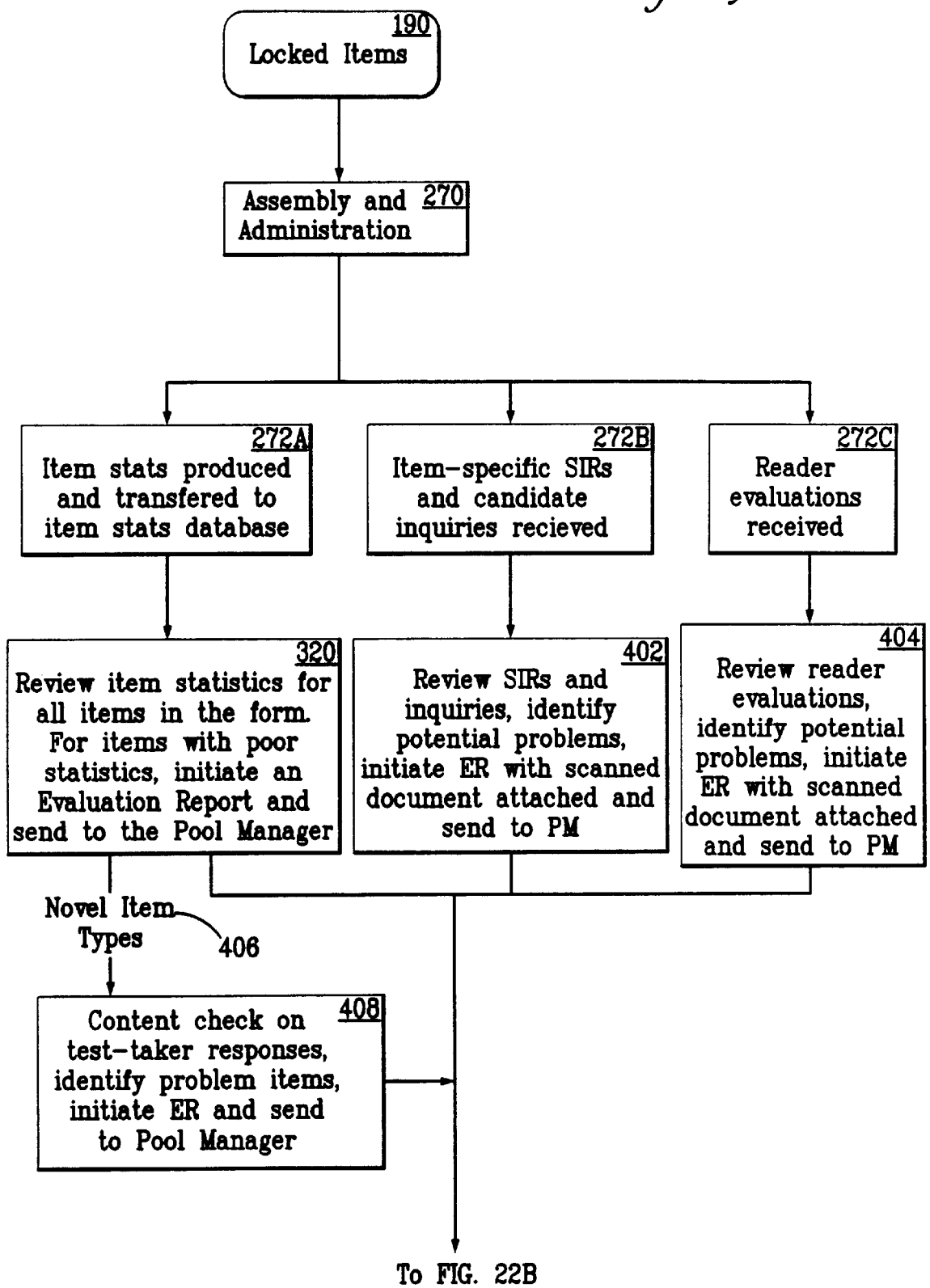

A detailed flow diagram for the item performance evaluation subsystem 400 is shown in FIGS. 22A–22E. As shown in FIG. 22A, the evaluation of item performance begins after a test, a pretest, test edition, or CAT pool has been administered 270 from locked items 190 and the test-taker responses have been aggregated and are available for analysis (272A, 272B and 272C).

a. The first step of the process is the gathering and sifting through data that may require the initiation of an evaluation report. The data includes item statistics (272A), SIRS, candidate inquiries (272B), and reader evaluations (272C) of constructed-response items.

Item statistics produced and transferred to item statistics database (272A)—Item analysis plans and the parameter files used in the routines are prepared in advance. As the test-taker responses are available for analysis, the item analysis (IA) routines are run and reviewed by statistical specialists to ensure the quality of the analysis. During the review of the IA results 320, items with unsatisfactory statistics are identified. In many cases, these items are already flagged on the IA output. Other identified items are documented on or with the output. Once the IA results are approved for release, the item statistics are transferred to the statistics database in the Test Creation System.

Item specific SIRs and candidate inquiries received (272B)—SIRs and candidate inquiries will usually arrive in the content groups. The staff assistant responsible for logging, distributing, and following up on these inquiries will have to make the distinction between item-specific questions and general construct or test questions. The latter do not have to be followed up in the item performance evaluation process. Reader evaluations received (272C)—Some programs with constructed-response scoring sessions, e.g., essay questions, gather evaluations of their items from readers. These evaluations, if they question the integrity of an item, should be summarized and inputted in an evaluation report.

b. The second major step in the process is to shift out the statistics, inquiries, or evaluations that require the initiation of an evaluation report. Following the initiation of an evaluation report, it is routed to the item manager's view. Review item statistics received 320—The purpose of this phase of work is to separate the items with good statistics and the items with unsatisfactory statistics. Items that have just completed pretesting and have good statistics are routed to the locked pool ready for assembly into a test. This work is performed using the statistics database. The database is divided according to item use (operational, pretest, or try-out) and status of review (either awaiting review, approved, open problems, resolved problems). Three separate forms (up to three for each item—IA, DIF and IRT) hold the statistics and an item history form shows the history of use and the status of the statistics review. The item statistics required (IA, DIF, and/or IRT) are indicated for a test, and status variables for each are shown for each item on the history form. These status variables are used to document the review and approval of item statistics and then to route the item to the locked item pool if all the item statistics are approved.

With the list of items with unsatisfactory statistics, analysis staff log into the TCS and access the statistics database. A staff member selects the type of item: operational, pretest, or try-out, and progresses sequentially through the IA, DIF, and IRT statistics. For example, the IA view, shown in FIG. 11A, contains a listing of records of IA statistics sorted by accession number.

Using the list of items with unsatisfactory statistics, the staff member opens a record for each item and an IA Form, as shown in FIG. 11, appears. The staff member then initiates an evaluation report and an "Item Evaluation Report" form appears as shown in FIGS. 25 and 25A. The staff member then inputs any specific details about the problem that needs to be documented/communicated to the item manager in the "further description of problem" field 320a.

If the statistics expert has determined that a pretest item cannot be included in any final tests because it cannot be included in the calibrations, the statement "Statistics are unsatisfactory, cannot be calibrated, item cannot be used in its present state" is recorded in the "further description of problem" field 320a. In the evaluation report form, to fill in the "reason for creating report" field 320b, the staff member selects "Poor statistics" from a pull-down menu. The staff member then forwards the evaluation report to the item manager (320 in FIG. 22A) by using the action button command. The staff member repeats these steps for each item that has unsatisfactory IA statistics.

For pretest items, once the staff member has initiated evaluation reports for all the items with unsatisfactory IA statistics, the member "batch approves" the remaining items (by clicking in the first column of all the statistics records to be approved and then clicking the "Batch Approval" button 320c, as shown in IA view in FIG. 11A). Once the statistics are approved, the selected records are moved to the "Approved" view.

If the staff member attempts to create an evaluation report for an item for which a report is already open, a notification appears and the member notifies the item manager of these further statistical problems. With agreement from the item manager, the staff member will then open the item repository, find the existing evaluation reports for these items and add to the "reason for creating report" and "Further description of problem" fields 320b and 320a, respectively, as appropriate.

When all of the required statistics for a pretest item (shown on the history record—FIG. 10B) have been approved, the item is moved into a locked pretest pool and is marked as available for use.

As shown in FIG. 22A, for novel item types 406, there is an off-line distracter analysis 408 that examines lists of responses for top scoring test-takers for each item. If evaluation reports are initiated based on problematic distracter analysis, the page of output for the item should be scanned into an electronic file and attached to the evaluation report.

Content check on test-taker response 408—For novel item types, item statistics alone are not sufficient to catch potential problems; all of the responses provided by top-scoring test-takers are reviewed b tent experts to determine if any correct responses have been left off the key. This review is performed using the output of the distracter analysis. Evaluation reports are initiated at 408 for any items with potential problems.

Review SIRs and candidate inquiries 402—To initiate the review of item-specific SIRs and candidate inquiries, a staff assistant logs into the TCS, enters the item repository, selects the item performance evaluation subsystem (402a in FIG. 23a) to view the user interface screen for the item performance subsystem 400 shown in FIG. 25C. The assistant then selects the "Report Creator" view 402b and for each item that requires a report, selects the "Create Evaluation Report" action button 402c to view the evaluation report and fills in the "Trigger and Identification" section 402d, as shown in FIG. 25.

As shown in FIG. 25, the assistant selects "external inquiry" in the drop down menu for "Reason for creating report" 320b and types in any further details about the nature of the inquiry in the "further description of problem" field 320a. The assistant then scans the SIR or candidate inquiry into an electronic file and attaches it to the report.

The assistant then forwards the evaluation report to the item manager 402 by using the action button command. The assistant repeats the steps above for each item that received an inquiry. If an evaluation report exists already, e.g., because of unsatisfactory statistics, the staff member notifies the Item Manager and adds the new information to the existing report. Review reader evaluations 404—To initiate further review for items that have been questioned during a scoring session, an assistant gains access to a problem item's evaluation report in the same manner as described above with the item-specific SIRs and inquiries. Here, the assistant types or scans the readers' evaluations into an electronic file and attaches it to the report. The assistant then forwards the evaluation report to the item manager 404 by using the action button command. The assistant repeats the steps above for each questioned item. If an evaluation report already exists, e.g., because of unsatisfactory statistics, the staff member notifies the item manager and adds the new information to the existing report.

Evaluation reports from item inventory 414 and assembly 274 Evaluation reports can also be initiated outside of the administration and item performance evaluation processes, e.g., in from item inventory analysis 414 or assembly 274, as shown in FIG. 22B, if there is something that comes to a content expert's attention that might require the dropping or deactivation of an item or a minor change to the item. This might include the death of a major political figure, a change in the conventions used in a discipline, or a new finding that proves an older finding invalid. The process for initiating an evaluation report from information provided from item inventory analysis 415 or assembly 275 is the same as described above.

C. The third major step in the process is the review of the evaluation reports by the item manager (410).

The item manager is responsible for making sure that each evaluation report is appropriately resolved. This responsibility covers a particular content area for one or more tests. The item manager should have the content expertise to recommend content solutions to problems and should have very good knowledge of item statistics and how to interpret them. If the item manager does not have knowledge of the particular content area, a content expert-either from an inside or an outside consultant, needs to be available to consult with the item manager.

The item manager monitors the item manager view in the item performance evaluation subsystem 400 on a regular basis, but with the most frequency following an administration period. For each report, the item manager performs the following steps (as appropriate):

1. Selects an evaluation report. This brings up the item evaluation report form shown in FIG. 25.
2. As a first step in determining the nature of the problem, the available information is analyzed by:
   reviewing the existing information in the "Trigger & Identification" section 402*d*.
   browsing the item by selecting the "Browse Item" button 410*a* in the "Basic Information" section 410*b*; this action fills in all the fields in that section.
   reviewing the associated item statistics by selecting the "Browse Item Statistics" button 410*c*; a combined IA/DIF/IRT view is displayed; if expected stats are not shown, check with analysis staff as to its progress. If the statement, "Statistics are unsatisfactory, cannot be calibrated, item cannot be used in its present state" is present in the "further description of problem" field 320*a*, the item needs to be classified as a "Major Problem—questionable item."
3. For operational items, in the "General Comments" field 410*e* in the "Actions" section 410*d*, type in the test forms and CAT pools, and the associated administration dates, in which this item appears (all of the test forms are shown in the keyword list in the "Test Form" field 410*f*).
4. Collect any further information about the problem, if needed.
5. Consult a Content Expert, if needed.
6. Specify the "Resolution Due Date" 410*g* in the "Actions" section 410*d*.
7. At this point, the Item Manager has enough information to make a recommendation for the actions needed to resolve the problem. These recommendations are recorded in the "Item Manager's Recommendations" field 410*h* in the "Actions" section 410*d*.

For pretest items, the following actions are possible: (1) OK as is; (2) minor problem—typographical error, small format error, small punctuation error, or minor update that, in the best judgment of the content group, will not affect statistics; (3) major problem—questionable item: (a) deactivate and make a variant, or (b) deactivate.

For operational items, the same actions are possible, with the addition of actions to correct current scoring: (1) item OK/no change in scoring—item remains locked in available pool; (2) minor problem/no change in scoring—minor typographical error, format flaw, punctuation error, or not up-to-date; error/update does not affect keyability; (3) defensible/no change in scoring—item blocked for use in new assemblies, but OK in active tests: (a) deactivate and make a variant, or (b) deactivate and delete; (4) item OK/change in scoring-printing, layout, or administrative error; item remains locked in available pool; (5) minor problem/change in scoring—typographical error, format flaw, punctuation error, or not-up-to-date; error/update affects keyability; (6) major problem/change in scoring—item fundamentally indefensible; blocked for use in new assemblies: deactivate and make a variant, or (b) deactivate.

8. If the item is in an operational test and requires a change to the item scoring, the item manager gets a PIN number and begins to fill out the PIN. The manager indicates the need for a change in scoring 410*i*, a description of the change 410*j*, and the PIN #410*k* fields in the "Actions" section 410*d*.
9. The item manager decides whether to get confirmation of the recommended actions as a group or individually. As shown in FIG. 22B, group review (416) by content and statistics confirmers is recommended when score reporting is waiting for decisions about items and when there are at least 10 items that need to be discussed. Otherwise, individual review (418) should be performed.

d. The fourth major step in the process is the review of the issue and the item by Content Experts.

i. Group Review

A meeting is called, with representation from all necessary functional areas, usually just analysis and content. Any initiated PIN forms are brought to the meeting. A final decision about the item's disposition is made and the Item Manager's recommendations are revised, if needed. The content, statistics and program direction representatives then sign the PIN form (416A).

ii. Individual Reviews

Figure 22D:
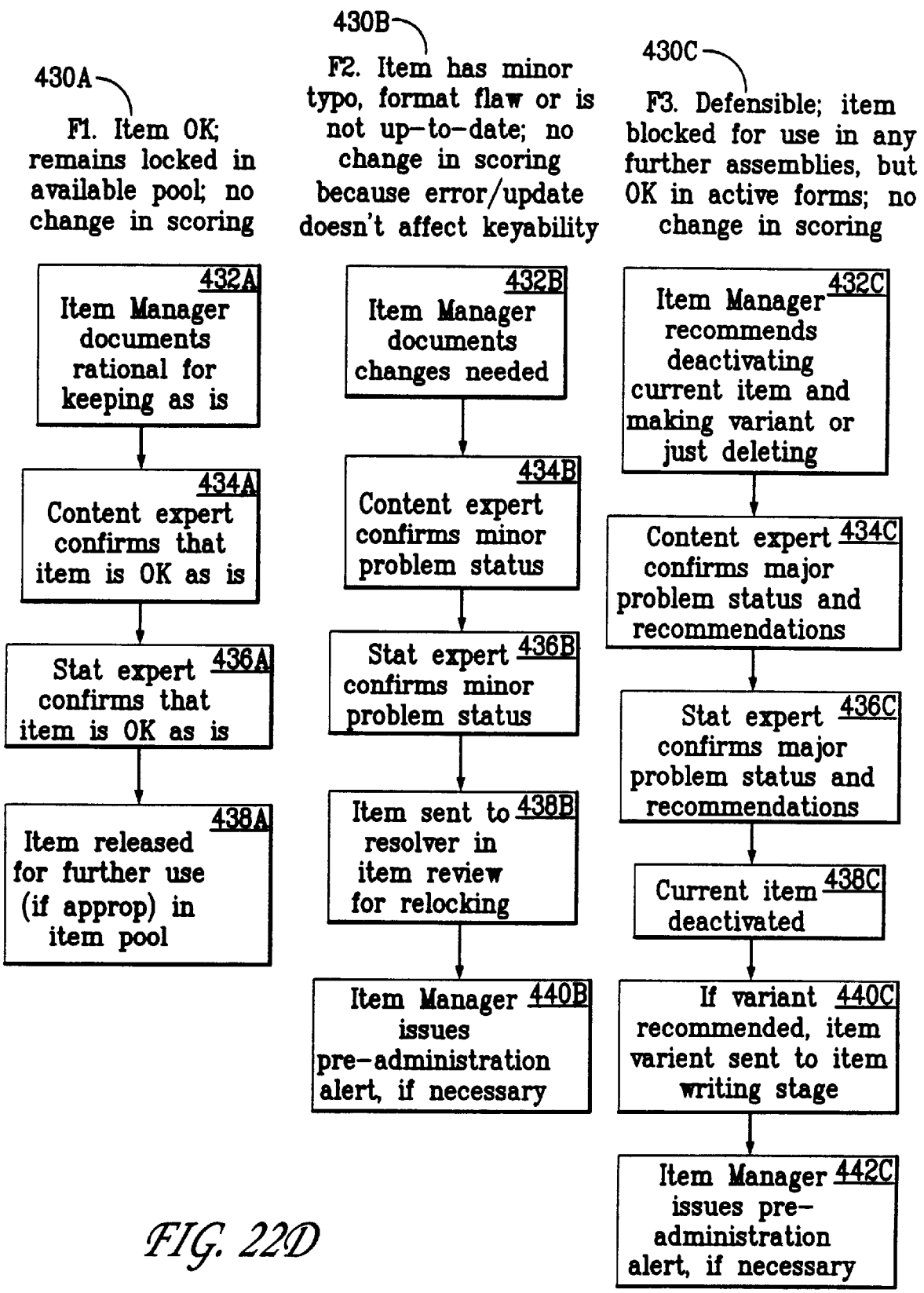

The item manager can electronically route the item to up to two experts (418A and 418B). The need for confirmers is dependent on the recommended resolution. FIGS. 22C, 22D and 22E indicate the action steps to be performed for pretest (FIG. 22C) and operational items (FIGS. 22D and 22E) with different recommended resolutions.

If confirmation is required, the item manager marks the "Confirmers Needed" Field 410*o* in the evaluation report, shown in FIG. 25, as needed. The item manager selects the "Actions" action button to select a particular staff member to whom the report needs to be routed. Selecting "OK" then sends the evaluation report to the "Confirmer 1" view, under the selected confirmer's name.

The selected confirmer logs into the TCS, finds the evaluation report under his or her name, and reviews the report. The confirmer browses the item and item statistics, as needed, and then indicates whether he or she agrees with the item manager's recommendation. When the confirmation step is complete, the confirmer clicks on the "Actions" action button and selects "Return to Item Manager."

The report returns to the item manager's view. The item manager notes whether the confirmer has agreed with the recommendation and reviews the confirmer's comments. If the confirmer disagrees with the item manager, they discuss the problem further and find a mutually acceptable resolution. If a second confirmer is needed, the steps just described are repeated.

e. The fifth step in the process calls for the item manager to initiate the resolution of the problem according to the decisions made by the item manager and the experts (420).

Descriptions, of any minor changes that have been deemed necessary and ideas on how to change the item if a variant is required, should be entered into the "General Comments" field 410e in the "Actions" section 410d on the evaluation report, as shown in FIG. 25. The item manager then records the action to be taken on the item in the "Final Decision" field 410n, as shown in FIG. 25A: (1) "confirmed as locked" is used when the item was deemed "OK as is;" (2) "deactivate" is used to deactivate; (3) "deactivate and clone" is used to deactivate the current version and create an item variant; and (4) "send to fairness reviewer" is used for items needing review for fairness considerations; (5) "send to final resolver" is used for items needing minor changes; and (6) "send to format reviewer" is used for items needing changes in format. If the decision was made to make a minor change to the item, the item manager enters the justification for this change in the "Reason for minor change" field 410p. To finalize the resolution of the item, the item manager clicks on the "Actions" action button, checks the information in the dialog box, selects the names of any staff members who participated in a group review session and selects "OK." The TCS then routes the item to the item repository 40 under its proper status or the proper stage of the item creation and review subsystem 100, as shown in FIG. 19, and closes the evaluation report.

Finally, the TCS automatically initiates a pre-administration alert which provides information to the item manager if a problem item, i.e., one that was just subjected to a change in status through the item performance evaluation process, appears in any currently assembled forms.

4. The Metrics and Management Subsystem

The metrics and management subsystem 500 is provided for monitoring the progress and/or checking the status of items in terms of metrics statistics and/or management statistics. The metrics statistics are calculated by cycle time, quality, and counts and the management statistics are calculated by cycle time and counts.

A count measures the number of items at a particular stage in a particular subsystem. The cycle time measures the number of days a particular item has been at a particular stage in a particular subsystem. The quality measures a percentage of either locked items, pre-test items, items with problems or specific item problems present in all problems out of an overall group of items that could potentially be designated as one of these items.

The user interface screen for using the metrics and management subsystem 500 is shown in FIG. 28. If a user logs on to the TCS, and views an item, it appears in the "Item Browser" form, as shown in FIGS. 27 and 27A.

D. State Diagram of the TCS

Figure 26A:
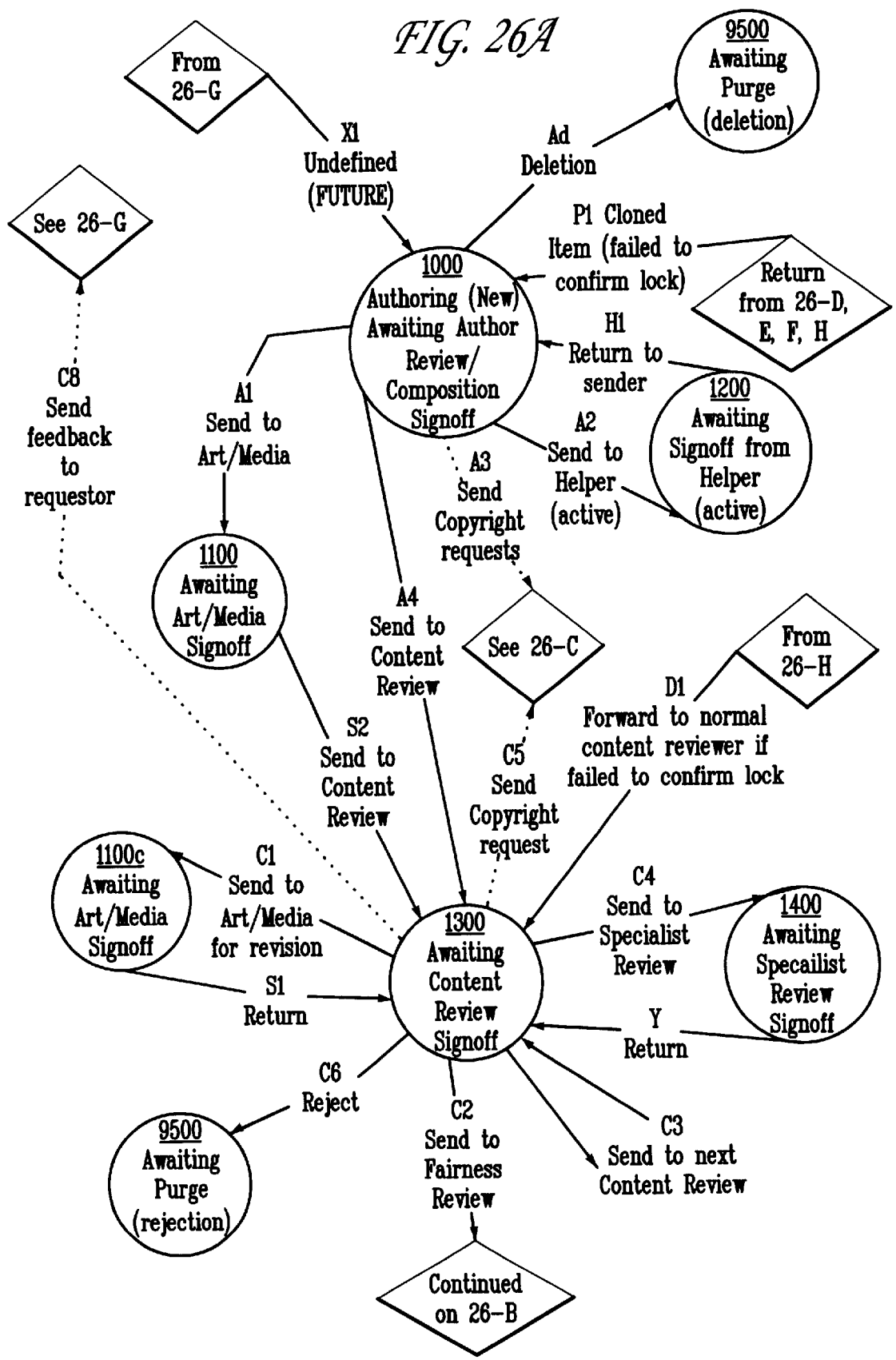
FIGS. 26A–26H together constitute a state diagram for the TCS of the invention.
Figure 26B:
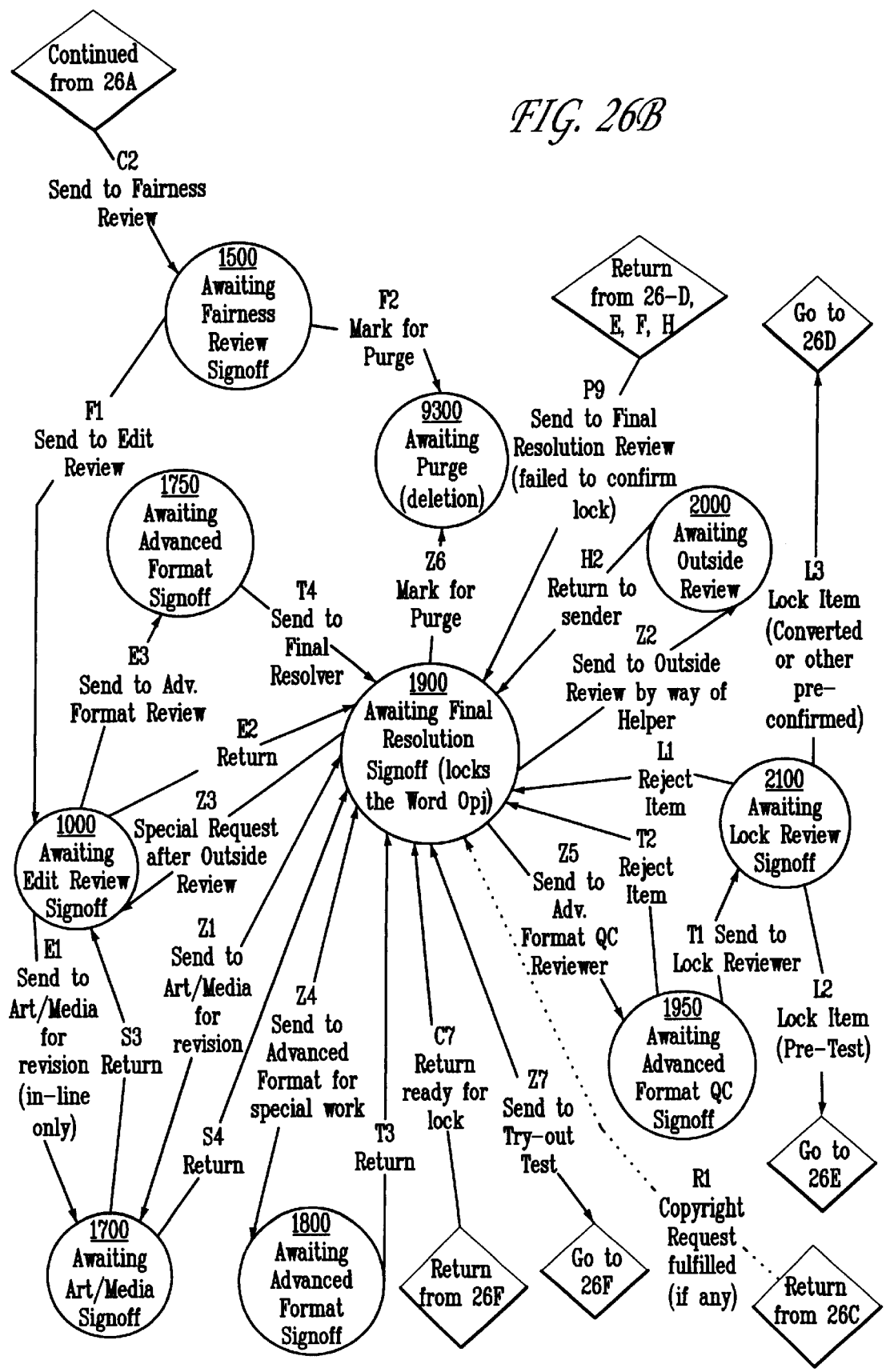
Figure 26C:
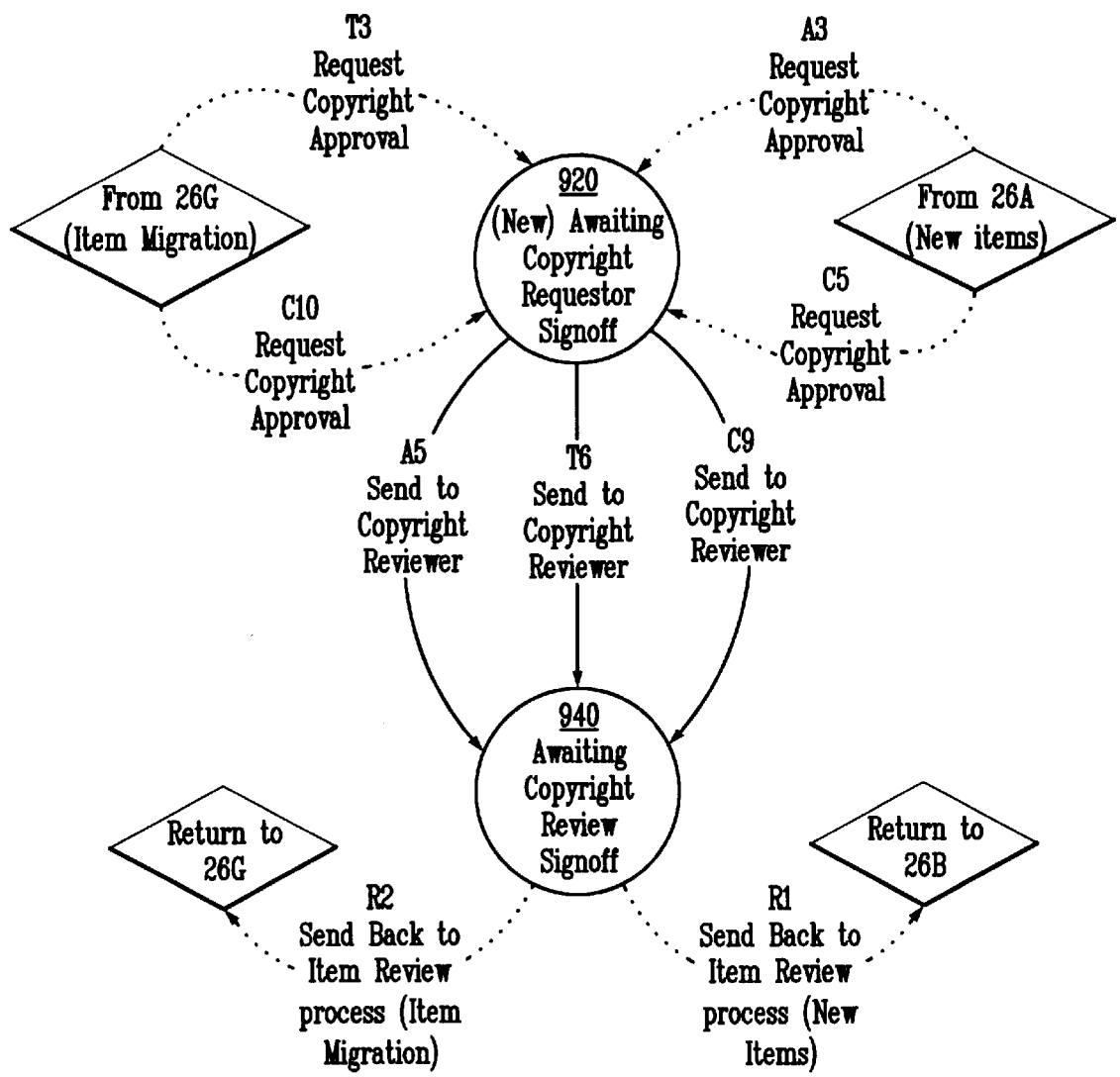
Figure 26D:
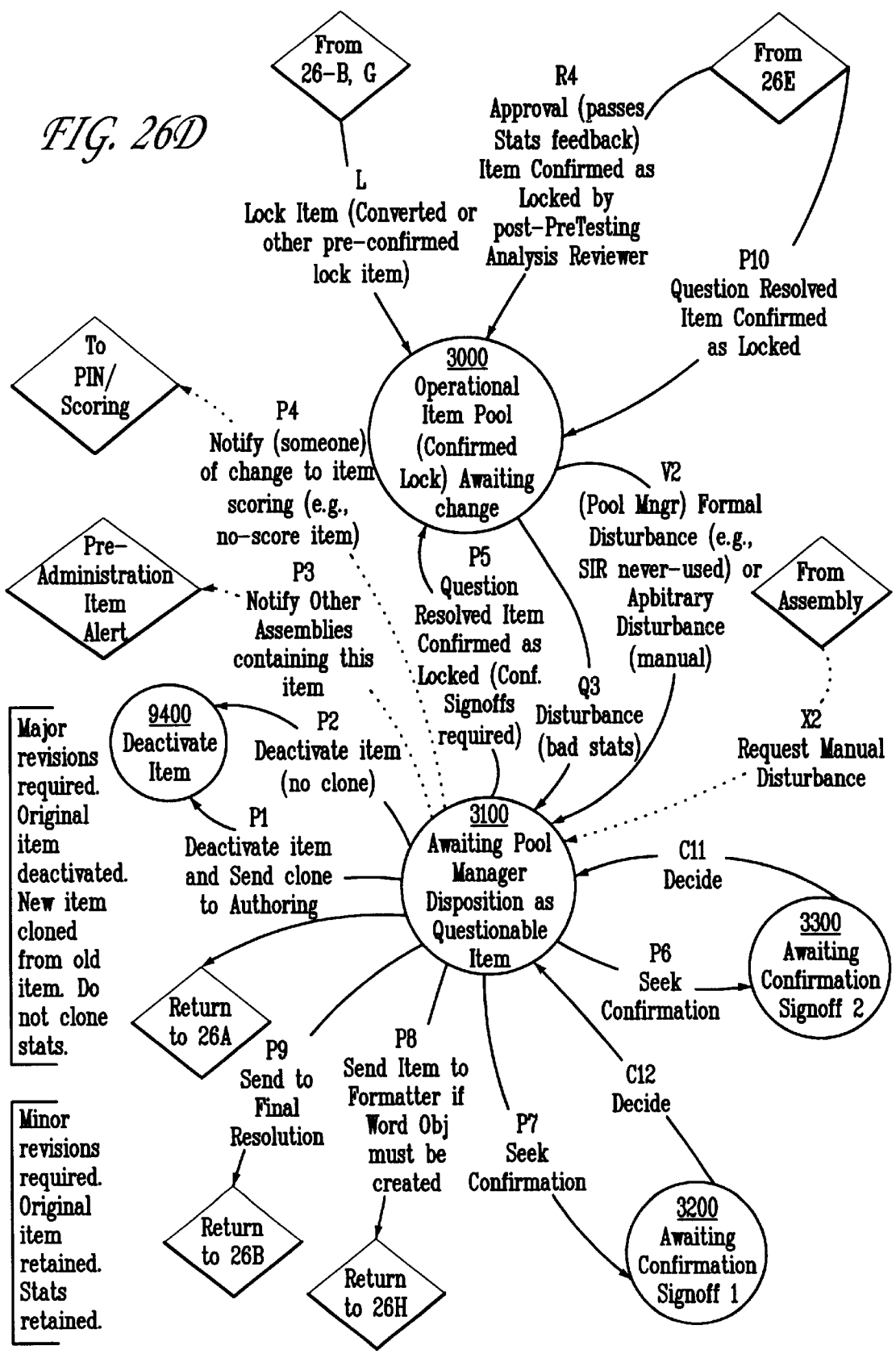
Figure 26E:
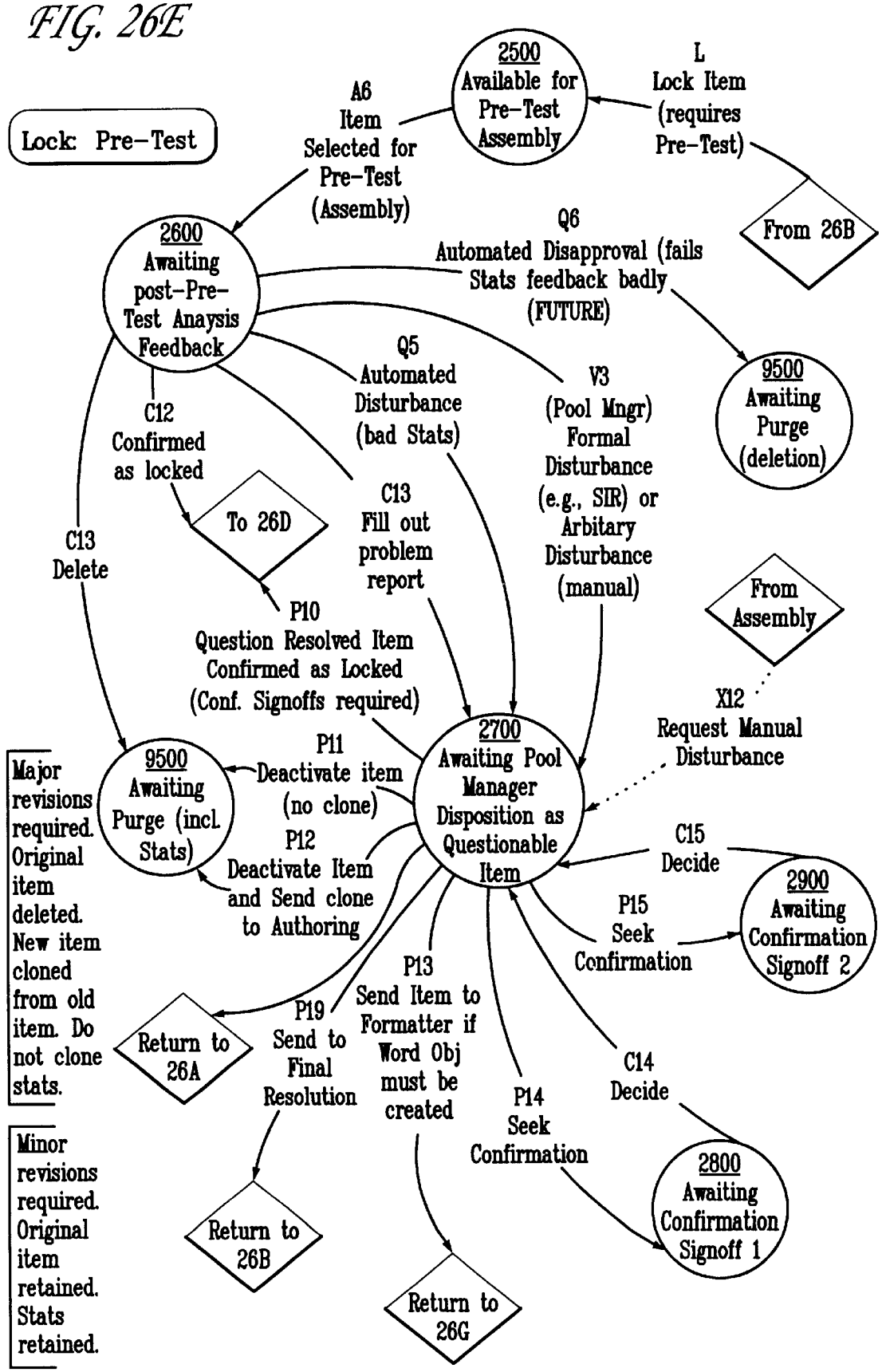
Figure 26F:
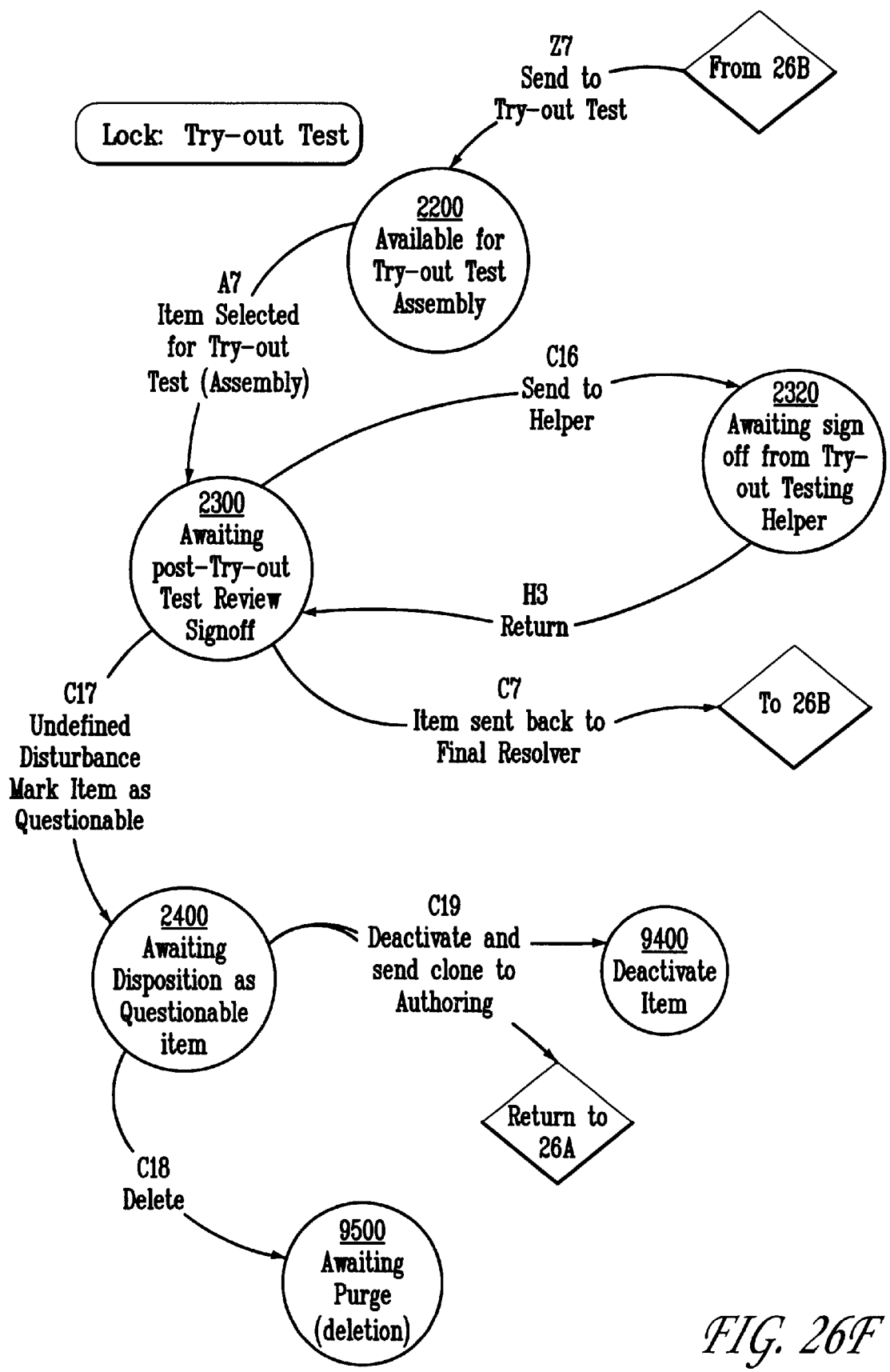
Figure 26G:
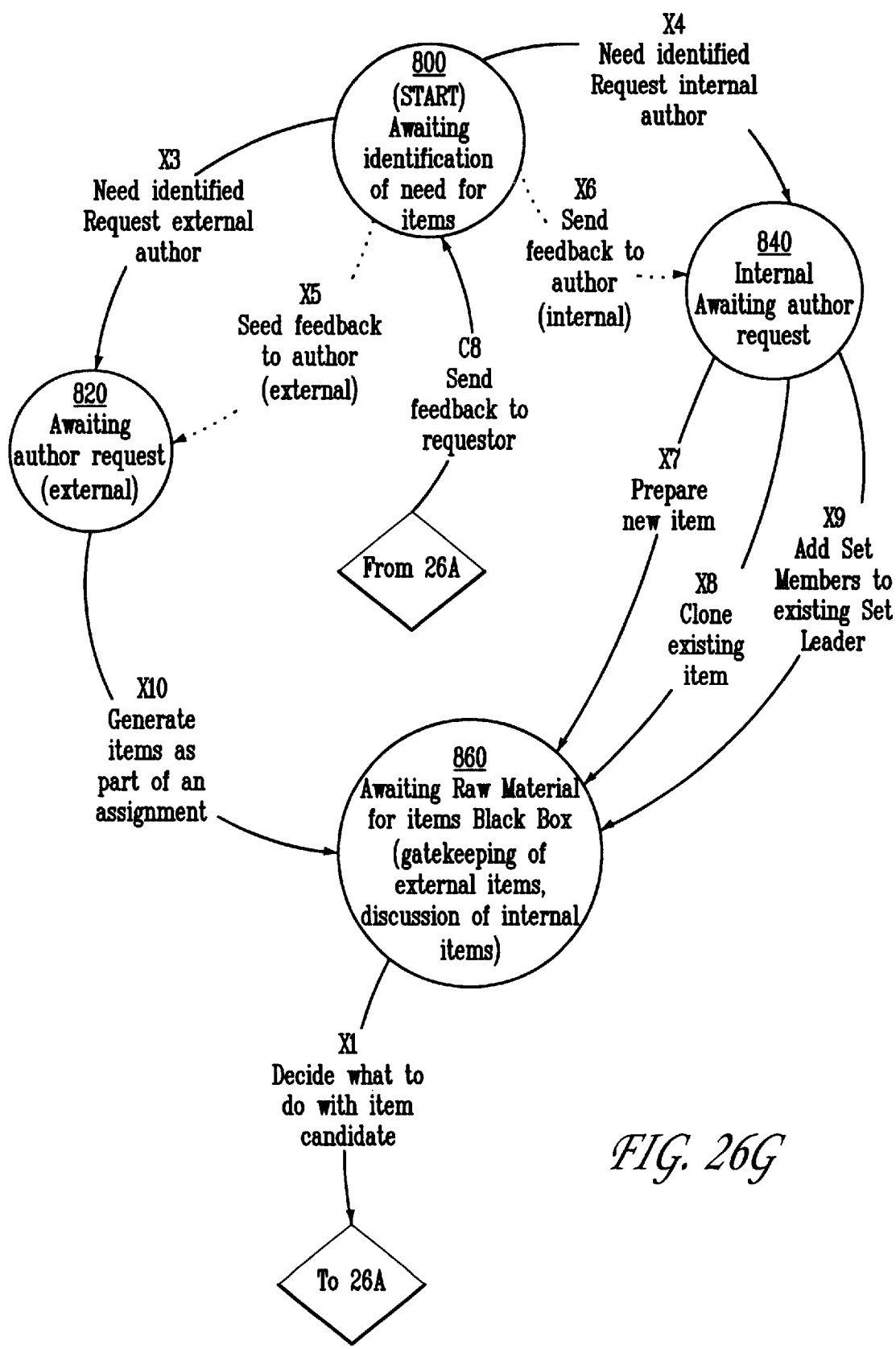

A state diagram for the TCS is shown in FIGS. 26A–26H. As shown in FIG. 26G, the process begins with the state of awaiting identification of a need for new items (800). From here, there is the need for an external author (X3) and/or an internal author (X4) to create an item. There also may be feedback to the external author (X5) or the internal author (X6). From the state of awaiting external author request 820, items are generated (X10). From the state of awaiting internal author request 840, a new item is prepared (X7), an existing item is cloned (X8) or set members are added to an existing set leader (X9) (A set is a group of items corresponding to the same stimulus, wherein a set leader is the primary item and set members are secondary items). From the state of awaiting raw material for items 860, a decision is made as what to do with an item candidate (X1).

The steps from one state to another are performed by different personnel. In FIGS. 26A–26H, A steps are performed by authors; C steps are performed by content staff; D steps are performed by proofreaders; E steps are performed by edit staff; F steps are performed by fairness staff; H steps are performed by helpers; T steps are performed by format staff; L steps are performed by lock -staff; P steps are performed by the pool manager, i.e., item manager; Q steps are automatically performed by the TCS; R steps are performed by Copyright staff; S steps are performed by art/media staff; V steps are performed by complaint dispatchers; X steps are performed by external personnel, i.e., off-line; Y steps are performed by specialists; Z steps are performed by final resolution staff.

Figure 26H:
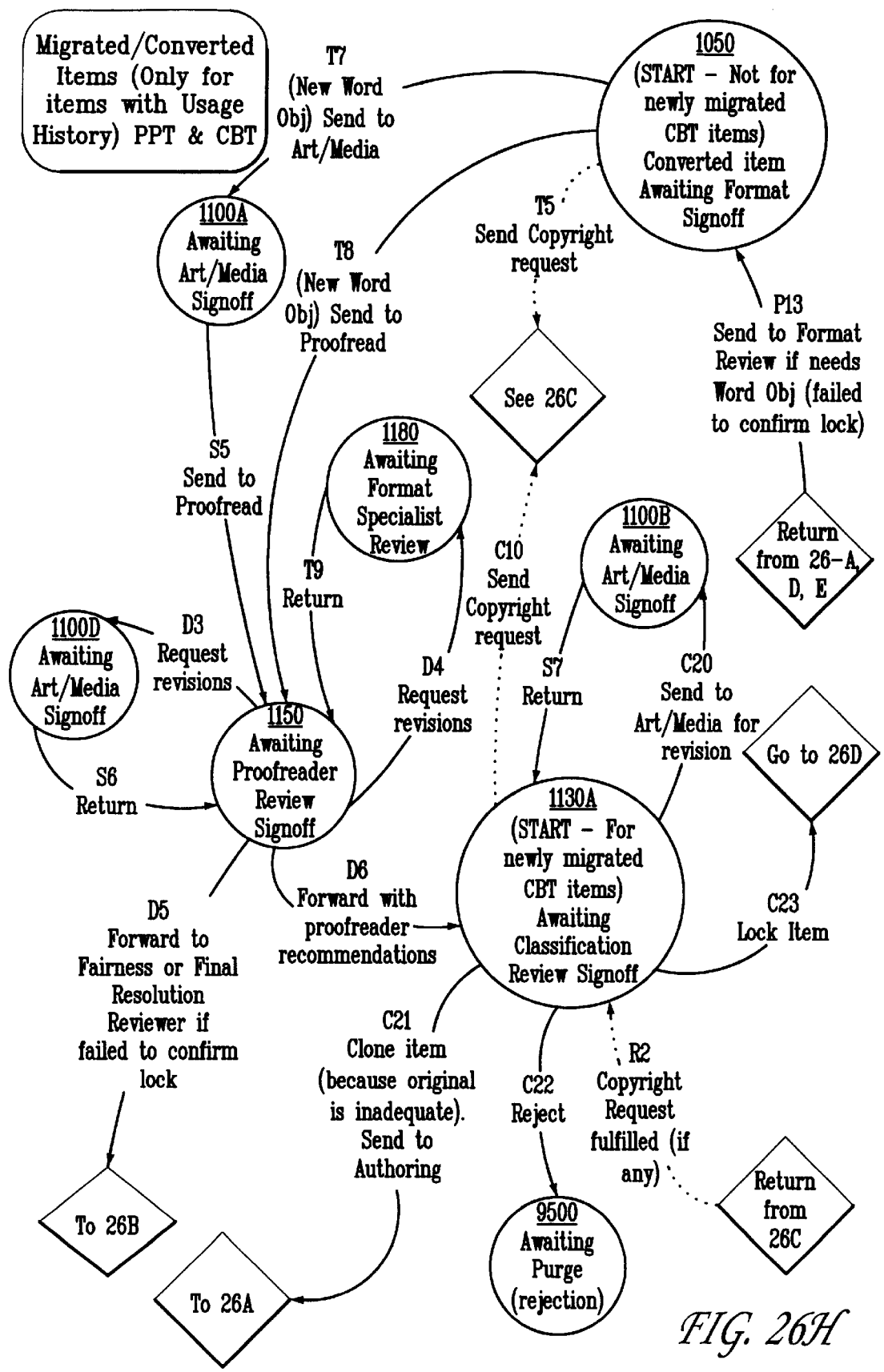

Migrated (or converted). items that have usage history, both CBT or PPT items, are introduced to the TCS in different ways. As shown in FIG. 26H, newly-migrated CBT items start at the state of awaiting classification review signoff 1130A. From here, items can be sent to art/media for revision (C20) (and returned S7). A copyright request may also be sent (C10) to copyright, or an item may be rejected (C22). After signoff from classification review 1130A, the items are either cloned and sent to authoring (C21) or locked (C23). Newly-migrated PPT items, on the other hand, start at the state of awaiting format signoff 1050. From here, a copyright request may be sent (T5) to copyright. After signoff from format 1050, items are either sent to art/media (T7) or to proofread (T8). After signoff from art/media 1100A, the item is sent to proofread (S5).

From the state of awaiting proofreader review signoff (1150), the item can be sent to art/media for revisions (D3) (and returned S6) or sent to format specialist review for revisions (D4) (and returned T9). After signoff from proofreader review (1150), items are either forwarded to fairness or final resolution review (D5) if no lock confirmation is received, or forwarded to the state of awaiting classification 1130A with proofreader recommendations (D6).

FIG. 26A illustrates item candidates (from FIG. 26G) which come into the state of authoring and awaiting author review 1000. From here, the item may be deleted (Ad) or sent to a helper (A2). After signoff From helper 1200, the item is returned to the state of authoring 1000. A copyright request may also be sent (A3). After signoff from helper 1200 (H1), the item is either sent to art/media (A1) or sent to content review (A4).

From the state of awaiting art/media to signoff 1100, the item is sent to content review (S2). From the state of awaiting content review signoff 1300, the item may be sent to art/media for revision (C1), rejected (C6), sent to the next content review (C3) and/or sent to a specialist for review (C4) and returned (Y).

From the state of awaiting content review signoff 1300, a copyright request (C5) may also be sent to copyright. From the state of awaiting specialist review to signoff 1400, the item is returned (Y) to content review. From the state of awaiting art/media to signoff 100C, the item is returned (Si) to content review. After signoff from content review 1300, the item is sent to fairness review (C2).

From the state of awaiting fairness review to signoff 1500 (FIG. 26B), the item is sent to edit review (F1) or/sent for deletion (F2) (or purge). From the state of awaiting edit review to signoff 1600, the item may be sent to art/media for revision El. After signoff from art/media 1700, the item is returned (S3) to edit review. After signoff from edit review 1600, the item is sent to advanced format review (E3). After signoff from advanced format 1750, the item is sent to the final resolver (T4).

From the state 1900 of awaiting final resolution signoff, the item can be sent for deletion (Z6); sent to art/media for revision (Z1) (and returned S4); sent to advanced format for special work (Z4) (and returned T3); sent to outside review (Z2) (and returned H2); sent to edit review (Z3) only after outside review (and returned E2); and/or sent for try-out (Z7) of the item (and returned C7). After signoff from final resolution 1900, the item is sent to advanced format QC (quality control) review (Z5). From here, the item may be rejected (T2) back to final resolution 1900.

After signoff from the advanced format QC review 1950, the item is sent to lock review (T1). From the state of awaiting lock review signoff 2100, the item may be rejected back to final resolution 1900 (L1). After signoff from lock review 2100, the item is either locked as a converted or other pre-confirmed locked item (L3) or locked as a pre-test item (L2).

There are several states throughout the TCS in which there is an option to request copyright approval. FIG. 26C illustrates the state of awaiting copyright request 920, which receives copyright requests from various states (C5, C10, A3 and T5). These requests are sent to copyright review (A5, T6 and C9). From this state awaiting copyright review 940, approval is sent back to the item review process (R1 and R2) from where it was requested so that copyright approval does not hold the item up from assembly in a test.

FIG. 26D illustrates items that are locked as a converted or other pre-confirmed locked items and sent to the state of operational item pool awaiting change 3000. From here, items with bad statistics are sent to the pool manager as disturbances (Q3) and items with formal disturbances (e.g., SIRs) or arbitrary disturbances (manual ones, i.e., those identified by a user) are also sent to the pool manager (V2). A manual disturbance may also be sent to the pool manager from assembly (X2).

From the state of awaiting the pool manager to decide on the disposition of a questionable item 3100, items can be deactivated (P2) or deactivated and cloned with the clone sent to authoring (P1) if major revisions are necessary. If minor revisions are required, items can be sent to format review (P8) if a word object must be created. The pool manager seeks confirmation from one confirmer (P7) (and confirmer 1 decides C12) and a second confirmer (P6) (and confirmer 2 decides C11) or conducts a group review. After both confirmer's decisions are received on the items needing minor revisions, the pool manager sends them to final resolution (P9). If a pool manager resolves a problem with questionable items that do not need changes, these items are sent back to the operational item pool as locked (P5). If a PIN was created by the pool manager, he or she sends the notice to scoring (P4). If a pre-administration alert occurs, the pool manager sends notice to other assemblies containing this item (P3).

As shown in FIG. 26E, items that are locked as pre-test items are sent (L) to the state of items that are available for pre-test assembly 2500. Items selected for pre-test assembly are sent (A6) to the state of awaiting post-pre-test analysis feedback 2600. From here, items may be sent for deletion (C13), automatically sent for deletion (Q6) because of bad statistics, or sent to the operational item pool confirmed as locked (C12).

From the state of items that are available for pre-test analysis feedback 2600, items with bad statistics are automatically sent to the pool manager 2700 as disturbances (Q5), items with formal disturbances (e.g., SIRS) or arbitrary disturbances (manual ones, i.e., those identified by a user) are also sent to the pool manager (V3), and/or items with problem reports are sent to the pool manager (C13). A manual disturbance may also be sent to the pool manager from assembly (X12).

From the state of awaiting the pool manager to decide on the disposition of a questionable item 2700, items can be deactivated (P11) or deactivated and cloned with the clone sent to authoring (P12) if major revisions are necessary. If minor revisions are required, items can be sent to format review (P13) if a word object must be created. The pool manager seeks confirmation from one confirmer (P14) (and confirmer 1 decides C14) and a second confirmer (P15) (and confirmer 2 decides C15) or conducts a group review. After both confirmer's decisions are received on the items needing minor revisions, the pool manager sends them to final resolution (P19). If a pool manager resolves a problem with questionable items that do not need changes, these items are sent back to the operational item pool as locked (P10).

FIG. 26F illustrates that items can be sent for try-out testing (Z7) from the state of awaiting final resolution to the state of available for try-out assembly (2200). From here, items selected for try-out test assembly are sent (A7) to the state of awaiting post-try-out test review 2300. From here, items can be sent to a helper (C16) (and returned H3). After signoff, an item can be sent back to final resolution (C7) or sent as a questionable item with an undefined disturbance (C17) to the state of awaiting disposition of the item 2400. From here, the item can be sent for deletion (C18) or deactivated and cloned by sending the clone to authoring (C19).

The Test Creation System of the present invention streamlines the item creation process by making the process more efficient and reduces the required number of steps and hand-offs than that required with the prior art TD/DC system. With the use of the item template, users of the TCS can view the item as it will be viewed in the test. The item creation and review subsystem as well as the other subsystems are versatile so that the TCS will allow for the creation of multimedia item types. The migration review subsystem allows for the conversion of items from the TD/DC system into the electronic form of the TCS. With the use of features such as electronic evaluation reports, the TCS of the present invention also improves the efficiency of the item performance evaluation stage of the item creation process. In general, the TCS provides a more efficient item creation system than that of the prior art.

It will be appreciated by those skilled in the art that the foregoing has set forth the presently preferred embodiment of the invention and an illustrative embodiment of the invention, but that numerous alternative embodiments are possible without departing from the novel teachings of the invention. All such modifications are intended to be included within the scope of the appended claims.

What is claimed is:

1. A method of updating a test item after an administration of the test item to test takers, comprising the steps of:

electronically reviewing feedback from the administration of the test item;

identifying a problem in the test item from the reviewed feedback;

associating the problem with one or more components of the test item;

automatically communicating the problem and the test item to one or more test creation terminals for review; and updating the test item as a function of the review using the test creation terminal.

2. The method of claim 1, further comprising storing the updated test item.

3. The method of claim 1, further comprising preventing further access to the test item by a test creation terminal, when the updating is accepted.

4. The method of claim 1, wherein the updating of the test item may include changing content of the test item.

5. The method of claim 1, wherein the updating of the test item may include changing a format of the test item.

6. The method of claim 1, wherein the problem is identified when a performance of the test item does not meet a predetermined performance criteria.

7. The method of claim 1, wherein the communication comprises storing the problem and the test item in a repository and electronically indicating to the one or more test creation terminals of the storing.

8. The method of claim 1, wherein the communication comprises transmitting an electronic signal representing the problem and the test item to the one or more test creation terminals.

9. The method of claim 1, wherein the feedback from the administration of the test item comprises at least one of the following: statistcal information, feedback from test takers, and reader evaluations.

10. The method of claim 1, wherein an electronic evaluation report is created or an existing electronic evaluation report is modified based on the feedback from the administration of the test.

11. he method of claim 1, wherein the components of the test item include at least one of the following: a written text representative of a test question, an answer key, and a stimulus to which the test question refers.

12. The method of claim 11, wherein the stimulus comprises at least one of: written text, graphics, video, audio, audiovisual material, animation and scanned images.

13. The method of claim 1, further comprising the step of generating a workflow log listing the progress of each test item form as it is reviewed.

14. The method of claim 1, further comprising maintaining a database of problems and associated test item components.

15. The method of claim 1, further comprising conducting a preliminary review of the problem before the communicating to the one or more test creation terminals.

16. The method of claim 1, further comprising creating a new test item as a function of the problem.

* * * * *